(12) United States Patent
Gopalan et al.

(10) Patent No.: US 10,156,986 B2
(45) Date of Patent: Dec. 18, 2018

(54) GANG MIGRATION OF VIRTUAL MACHINES USING CLUSTER-WIDE DEDUPLICATION

(71) Applicant: The Research Foundation for The State University of New York, Binghamton, NY (US)

(72) Inventors: Kartlik Gopalan, Vestal, NY (US); Umesh Deshpande, Binghamton, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 15/818,163

(22) Filed: Nov. 20, 2017

(65) Prior Publication Data

US 2018/0113610 A1   Apr. 26, 2018

Related U.S. Application Data

(63) Continuation of application No. 14/709,957, filed on May 12, 2015, now Pat. No. 9,823,842.

(Continued)

(51) Int. Cl.

| | |
|---|---|
| G06F 12/00 | (2006.01) |
| G06F 13/00 | (2006.01) |
| G06F 3/06 | (2006.01) |
| G06F 9/50 | (2006.01) |
| G06F 11/14 | (2006.01) |
| G06F 9/455 | (2018.01) |

(52) U.S. Cl.
CPC ............ *G06F 3/06* (2013.01); *G06F 3/065* (2013.01); *G06F 3/067* (2013.01); *G06F 3/0619* (2013.01); *G06F 3/0641* (2013.01); *G06F 9/455* (2013.01); *G06F 9/45558* (2013.01); *G06F 9/5027* (2013.01); *G06F 9/5088* (2013.01); *G06F 11/1453* (2013.01); *G06F 2009/45562* (2013.01)

(58) Field of Classification Search
CPC .................................................. G06F 11/1452
USPC .................................................. 711/161–162
See application file for complete search history.

(56) References Cited

U.S. PATENT DOCUMENTS

| | | |
|---|---|---|
| 5,003,463 A | 3/1991 | Coyle et al. |
| 5,185,874 A | 2/1993 | Trent et al. |

(Continued)

*Primary Examiner* — Sean D Rossiter
(74) *Attorney, Agent, or Firm* — Steven M. Hoffberg; Tully Rinckey PLLC

(57) ABSTRACT

Gang migration refers to the simultaneous live migration of multiple Virtual Machines (VMs) from one set of physical machines to another in response to events such as load spikes and imminent failures. Gang migration generates a large volume of network traffic and can overload the core network links and switches in a datacenter. In this paper, we present an approach to reduce the network overhead of gang migration using global deduplication (GMGD). GMGD identifies and eliminates the retransmission of duplicate memory pages among VMs running on multiple physical machines in the cluster. The design, implementation and evaluation of a GMGD prototype is described using QEMU/KVM VMs. Evaluations on a 30-node Gigabit Ethernet cluster having 10GigE core links shows that GMGD can reduce the network traffic on core links by up to 65% and the total migration time of VMs by up to 42% when compared to the default migration technique in QEMU/KVM. Furthermore, GMGD has a smaller adverse performance impact on network-bound applications.

20 Claims, 6 Drawing Sheets

Related U.S. Application Data

(60) Provisional application No. 61/992,037, filed on May 12, 2014.

(56) References Cited

U.S. PATENT DOCUMENTS

| | | | |
|---|---|---|---|
| 5,235,684 A | 8/1993 | Becker et al. |
| 5,261,057 A | 11/1993 | Coyle et al. |
| 5,379,379 A | 1/1995 | Becker et al. |
| 5,457,694 A | 10/1995 | Smith |
| 5,684,994 A | 11/1997 | Tanaka et al. |
| 5,910,175 A | 6/1999 | Malson |
| 5,951,615 A | 9/1999 | Malson |
| 6,078,856 A | 6/2000 | Malson |
| 6,706,619 B2 | 3/2004 | Miller et al. |
| 6,707,077 B2 | 3/2004 | Miller |
| 6,993,762 B1 | 1/2006 | Pierre |
| 6,993,818 B2 | 2/2006 | Smith et al. |
| 7,133,953 B2 | 11/2006 | Barrenscheen |
| 7,313,177 B2 | 12/2007 | Radjassamy |
| 7,313,575 B2 | 12/2007 | Carr et al. |
| 7,369,900 B2 | 5/2008 | Zdravkovic |
| 7,702,660 B2 | 4/2010 | Chan et al. |
| 7,783,360 B2 | 8/2010 | Zdravkovic et al. |
| 7,783,363 B2 | 8/2010 | Zdravkovic et al. |
| 7,814,142 B2 | 10/2010 | Mamou et al. |
| 7,814,470 B2 | 10/2010 | Mamou et al. |
| 7,991,800 B2 | 8/2011 | Lawrence et al. |
| 8,041,760 B2 | 10/2011 | Mamou et al. |
| 8,060,553 B2 | 11/2011 | Mamou et al. |
| 8,140,491 B2 | 3/2012 | Mandagere et al. |
| 8,166,265 B1 | 4/2012 | Feathergill |
| 8,285,681 B2 | 10/2012 | Prahlad et al. |
| 8,307,177 B2 | 11/2012 | Prahlad et al. |
| 8,335,902 B1 | 12/2012 | Feathergill |
| 8,370,560 B2 | 2/2013 | Dow et al. |
| 8,407,190 B2 | 3/2013 | Prahlad et al. |
| 8,407,193 B2 | 3/2013 | Gruhl et al. |
| 8,407,428 B2 | 3/2013 | Cheriton et al. |
| 8,429,649 B1 | 4/2013 | Feathergill et al. |
| 8,433,682 B2 | 4/2013 | Ngo |
| 8,442,955 B2 | 5/2013 | Al Kiswany et al. |
| 8,468,135 B2 | 6/2013 | Constantinescu et al. |
| 8,504,670 B2 | 8/2013 | Wu et al. |
| 8,504,791 B2 | 8/2013 | Cheriton et al. |
| 8,516,158 B1 | 8/2013 | Wu et al. |
| 8,527,544 B1 | 9/2013 | Colgrove et al. |
| 8,589,640 B2 | 11/2013 | Colgrove et al. |
| 8,595,188 B2 | 11/2013 | Gruhl et al. |
| 8,595,191 B2 | 11/2013 | Prahlad et al. |
| 8,595,460 B2 | 11/2013 | Bhat et al. |
| 8,612,439 B2 | 12/2013 | Prahlad et al. |
| 8,620,870 B2 | 12/2013 | Dwarampudi et al. |
| 8,635,615 B2 | 1/2014 | Chiang et al. |
| 8,639,658 B1 | 1/2014 | Kumaresan |
| 8,639,989 B1 | 1/2014 | Sorenson, III et al. |
| 8,645,664 B1 | 2/2014 | Colgrove et al. |
| 8,650,359 B2 | 2/2014 | Vaghani et al. |
| 8,650,566 B2 | 2/2014 | Vaghani et al. |
| 8,676,937 B2 | 3/2014 | Rapaport et al. |
| 8,677,085 B2 | 3/2014 | Vaghani et al. |
| 8,688,650 B2 | 4/2014 | Mutalik et al. |
| 8,694,469 B2 | 4/2014 | Parab |
| 8,707,070 B2 | 4/2014 | Muller |
| 8,719,540 B1 | 5/2014 | Miller et al. |
| 8,725,973 B2 | 5/2014 | Prahlad et al. |
| 8,732,434 B2 | 5/2014 | Hwang et al. |
| 8,739,244 B1 | 5/2014 | Wu et al. |
| 8,745,320 B2 | 6/2014 | Gupta et al. |
| 8,769,105 B2 | 7/2014 | Lacapra |
| 8,769,174 B2 | 7/2014 | Sokolinski et al. |
| 8,775,773 B2 | 7/2014 | Acharya et al. |
| 8,775,774 B2 | 7/2014 | Desai et al. |
| 8,782,395 B1 | 7/2014 | Ly |
| 8,788,788 B2 | 7/2014 | Colgrove et al. |
| 8,793,427 B2 | 7/2014 | Lim et al. |
| 8,793,467 B2 | 7/2014 | Colgrove et al. |
| 8,806,160 B2 | 8/2014 | Colgrove et al. |
| 8,806,489 B2 | 8/2014 | Freimuth et al. |
| 8,843,636 B1 | 9/2014 | Wu et al. |
| 8,849,761 B2 | 9/2014 | Prahlad et al. |
| 8,849,955 B2 | 9/2014 | Prahlad et al. |
| 8,856,489 B2 | 10/2014 | Colgrove et al. |
| 8,856,790 B1 | 10/2014 | Feathergill et al. |
| 8,874,863 B2 | 10/2014 | Mutalik et al. |
| 8,886,691 B2 | 11/2014 | Colgrove et al. |
| 8,898,114 B1 | 11/2014 | Feathergill et al. |
| 8,898,166 B1 | 11/2014 | Navrides et al. |
| 8,904,113 B2 | 12/2014 | Chen et al. |
| 8,909,845 B1 | 12/2014 | Sobel et al. |
| 8,914,610 B2 | 12/2014 | Bhat et al. |
| 8,930,307 B2 | 1/2015 | Colgrove et al. |
| 8,930,647 B1 | 1/2015 | Smith |
| 8,935,506 B1 | 1/2015 | Gopalan |
| 8,938,723 B1 | 1/2015 | Tormasov et al. |
| 8,949,570 B2 | 2/2015 | Desai et al. |
| 8,950,009 B2 | 2/2015 | Vijayan et al. |
| 8,954,710 B2 | 2/2015 | Colgrove et al. |
| 8,959,312 B2 | 2/2015 | Acharya et al. |
| 8,966,191 B2 | 2/2015 | Flynn et al. |
| 8,966,453 B1 | 2/2015 | Zamfir et al. |
| 8,977,838 B1 | 3/2015 | Mass et al. |
| 8,982,656 B2 | 3/2015 | Mitani et al. |
| 8,983,915 B2 | 3/2015 | Mutalik et al. |
| 8,984,221 B2 | 3/2015 | Satoyama et al. |
| 8,996,468 B1 | 3/2015 | Mattox |
| 8,996,800 B2 | 3/2015 | Venkatesh et al. |
| 8,996,814 B2 | 3/2015 | Peinado et al. |
| 8,997,179 B2 | 3/2015 | Kruglick |
| 9,009,437 B1 | 4/2015 | Bjornsson et al. |
| 9,015,417 B2 | 4/2015 | Agrawal et al. |
| 9,020,890 B2 | 4/2015 | Kottomtharayil et al. |
| 9,021,282 B2 | 4/2015 | Muller |
| 9,021,314 B1 | 4/2015 | Sorenson, III et al. |
| 9,021,452 B2 | 4/2015 | Kripalani |
| 9,027,020 B2 | 5/2015 | Edholm et al. |
| 9,032,157 B2 | 5/2015 | Ghai et al. |
| 9,032,181 B2 | 5/2015 | Ahmad et al. |
| 9,037,822 B1 | 5/2015 | Meiri et al. |
| 9,043,790 B2 | 5/2015 | Castillo et al. |
| 9,047,221 B2 | 6/2015 | Guthrie et al. |
| 9,058,195 B2 | 6/2015 | Ghai et al. |
| 9,058,212 B2 | 6/2015 | Wang et al. |
| 9,059,976 B2 | 6/2015 | Lacapra |
| 9,069,677 B2 | 6/2015 | Balani et al. |
| 9,069,701 B2 | 6/2015 | Guthrie et al. |
| 9,069,786 B2 | 6/2015 | Colgrove et al. |
| 9,069,799 B2 | 6/2015 | Vijayan |
| 9,069,997 B2 | 6/2015 | Partington et al. |
| 9,081,787 B2 | 7/2015 | Bolte et al. |
| 9,098,514 B2 | 8/2015 | Dwarampudi et al. |
| 9,110,965 B1 | 8/2015 | Shah et al. |
| 9,116,633 B2 | 8/2015 | Sancheti et al. |
| 9,116,737 B2 | 8/2015 | Aswathanarayana et al. |
| 9,116,803 B1 | 8/2015 | Agrawal et al. |
| 9,116,812 B2 | 8/2015 | Joshi et al. |
| 9,135,171 B2 | 9/2015 | Baskakov et al. |
| 9,146,980 B1 | 9/2015 | Navrides et al. |
| 9,147,373 B2 | 9/2015 | Cunningham et al. |
| 9,158,546 B1 | 10/2015 | Smith |
| 9,164,679 B2 | 10/2015 | Smith |
| 9,170,744 B1 | 10/2015 | Smith |
| 9,171,008 B2 | 10/2015 | Prahlad et al. |
| 9,176,671 B1 | 11/2015 | Smith |
| 9,176,883 B2 | 11/2015 | Yang |
| 9,182,914 B1 | 11/2015 | Smith |
| 9,189,442 B1 | 11/2015 | Smith |
| 9,195,395 B1 | 11/2015 | Smith |
| 9,195,489 B2 | 11/2015 | Bolte et al. |
| 9,201,906 B2 | 12/2015 | Kumarasamy et al. |
| 9,202,076 B1 | 12/2015 | Chazin et al. |
| 9,208,161 B2 | 12/2015 | Dow et al. |
| 9,213,711 B2 | 12/2015 | Dow et al. |
| 9,213,848 B2 | 12/2015 | Vijayan et al. |
| 9,223,507 B1 | 12/2015 | Smith |

(56) References Cited

U.S. PATENT DOCUMENTS

| | | |
|---|---|---|
| 9,223,597 B2 | 12/2015 | Deshpande et al. |
| 9,223,767 B1 | 12/2015 | Powell |
| 9,229,645 B2 | 1/2016 | Nakajima |
| 9,235,589 B2 | 1/2016 | DAmore et al. |
| 9,239,688 B2 | 1/2016 | Colgrove et al. |
| 9,239,786 B2 | 1/2016 | Ki et al. |
| 9,244,967 B2 | 1/2016 | Provenzano et al. |
| 9,250,817 B2 | 2/2016 | Flynn et al. |
| 9,251,066 B2 | 2/2016 | Colgrove et al. |
| 9,251,198 B2 | 2/2016 | Mutalik et al. |
| 9,823,842 B2 | 11/2017 | Gopalan et al. |
| 2003/0126339 A1 | 7/2003 | Barrenscheen |
| 2004/0223542 A1 | 11/2004 | Radjassamy |
| 2005/0039074 A1 | 2/2005 | Tremblay et al. |
| 2005/0222931 A1 | 10/2005 | Mamou et al. |
| 2005/0223109 A1 | 10/2005 | Mamou et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0262188 A1 | 11/2005 | Mamou et al. |
| 2005/0262189 A1 | 11/2005 | Mamou et al. |
| 2005/0262190 A1 | 11/2005 | Mamou et al. |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2005/0278270 A1 | 12/2005 | Carr et al. |
| 2006/0010195 A1 | 1/2006 | Mamou et al. |
| 2006/0020735 A1 | 1/2006 | Barrenscheen |
| 2006/0069717 A1 | 3/2006 | Mamou et al. |
| 2008/0027788 A1 | 1/2008 | Lawrence et al. |
| 2008/0147906 A1 | 6/2008 | Hamamura |
| 2009/0240916 A1 | 9/2009 | Tremblay et al. |
| 2010/0011368 A1 | 1/2010 | Arakawa et al. |
| 2010/0070725 A1 | 3/2010 | Prahlad et al. |
| 2010/0241654 A1 | 9/2010 | Wu et al. |
| 2010/0241673 A1 | 9/2010 | Wu et al. |
| 2010/0241726 A1 | 9/2010 | Wu |
| 2010/0241807 A1 | 9/2010 | Wu et al. |
| 2010/0299667 A1 | 11/2010 | Ahmad et al. |
| 2010/0332401 A1 | 12/2010 | Prahlad et al. |
| 2010/0332454 A1 | 12/2010 | Prahlad et al. |
| 2010/0332456 A1 | 12/2010 | Prahlad et al. |
| 2010/0332479 A1 | 12/2010 | Prahlad et al. |
| 2010/0332818 A1 | 12/2010 | Prahlad et al. |
| 2010/0333116 A1 | 12/2010 | Prahlad et al. |
| 2011/0153391 A1 | 6/2011 | Tenbrock |
| 2011/0161291 A1 | 6/2011 | Taleck et al. |
| 2011/0161297 A1 | 6/2011 | Parab |
| 2011/0161723 A1 | 6/2011 | Taleck et al. |
| 2011/0191522 A1 | 8/2011 | Condict et al. |
| 2011/0238775 A1 | 9/2011 | Wu et al. |
| 2011/0271010 A1 | 11/2011 | Kenchammana et al. |
| 2012/0016845 A1 | 1/2012 | Bates |
| 2012/0017027 A1 | 1/2012 | Baskakov et al. |
| 2012/0084261 A1 | 4/2012 | Parab |
| 2012/0089764 A1 | 4/2012 | Baskakov et al. |
| 2012/0102455 A1 | 4/2012 | Ambat et al. |
| 2012/0158674 A1 | 6/2012 | Lillibridge |
| 2012/0159081 A1 | 6/2012 | Agrawal et al. |
| 2012/0216052 A1 | 8/2012 | Dunn |
| 2012/0260060 A1 | 10/2012 | Hwang et al. |
| 2012/0290950 A1 | 11/2012 | Rapaport et al. |
| 2012/0291027 A1 | 11/2012 | Chiang et al. |
| 2013/0013865 A1 | 1/2013 | Venkatesh et al. |
| 2013/0024424 A1 | 1/2013 | Prahlad et al. |
| 2013/0024645 A1 | 1/2013 | Cheriton et al. |
| 2013/0031331 A1 | 1/2013 | Cheriton et al. |
| 2013/0031499 A1 | 1/2013 | Vishnubhatta et al. |
| 2013/0042052 A1 | 2/2013 | Colgrove et al. |
| 2013/0046949 A1 | 2/2013 | Colgrove et al. |
| 2013/0054888 A1 | 2/2013 | Bhat et al. |
| 2013/0054889 A1 | 2/2013 | Vaghani et al. |
| 2013/0054890 A1 | 2/2013 | Desai et al. |
| 2013/0054910 A1 | 2/2013 | Vaghani et al. |
| 2013/0054932 A1 | 2/2013 | Acharya et al. |
| 2013/0055248 A1 | 2/2013 | Sokolinski et al. |
| 2013/0055249 A1 | 2/2013 | Vaghani et al. |
| 2013/0061014 A1 | 3/2013 | Prahlad et al. |
| 2013/0073821 A1 | 3/2013 | Flynn et al. |
| 2013/0086006 A1 | 4/2013 | Colgrove et al. |
| 2013/0086353 A1 | 4/2013 | Colgrove et al. |
| 2013/0093565 A1 | 4/2013 | Partington et al. |
| 2013/0097377 A1 | 4/2013 | Satoyama et al. |
| 2013/0097380 A1 | 4/2013 | Colgrove et al. |
| 2013/0185457 A1 | 7/2013 | Campbell |
| 2013/0198459 A1 | 8/2013 | Joshi et al. |
| 2013/0227236 A1 | 8/2013 | Flynn et al. |
| 2013/0232198 A1 | 9/2013 | Tenbrock |
| 2013/0232215 A1 | 9/2013 | Gupta et al. |
| 2013/0238572 A1 | 9/2013 | Prahlad et al. |
| 2013/0262386 A1 | 10/2013 | Kottomtharayil et al. |
| 2013/0262410 A1 | 10/2013 | Liu et al. |
| 2013/0262615 A1 | 10/2013 | Ankireddypalle et al. |
| 2013/0297854 A1 | 11/2013 | Gupta et al. |
| 2013/0297855 A1 | 11/2013 | Gupta et al. |
| 2013/0297907 A1 | 11/2013 | Ki et al. |
| 2013/0311433 A1 | 11/2013 | Gero et al. |
| 2013/0318051 A1 | 11/2013 | Kumar et al. |
| 2013/0332660 A1 | 12/2013 | Talagala et al. |
| 2013/0339297 A1 | 12/2013 | Chen |
| 2013/0339302 A1 | 12/2013 | Zhang et al. |
| 2013/0339303 A1 | 12/2013 | Potter et al. |
| 2013/0339319 A1 | 12/2013 | Woodward et al. |
| 2013/0339471 A1 | 12/2013 | Bhargava et al. |
| 2013/0339643 A1 | 12/2013 | Tekade et al. |
| 2013/0346720 A1 | 12/2013 | Colgrove et al. |
| 2013/0346723 A1 | 12/2013 | Kawamura |
| 2014/0006731 A1 | 1/2014 | Uluski et al. |
| 2014/0025770 A1 | 1/2014 | Warfield et al. |
| 2014/0025872 A1 | 1/2014 | Flynn et al. |
| 2014/0059279 A1 | 2/2014 | He et al. |
| 2014/0074804 A1 | 3/2014 | Colgrove et al. |
| 2014/0082145 A1 | 3/2014 | Lacapra |
| 2014/0090016 A1 | 3/2014 | Kruglick |
| 2014/0095439 A1 | 4/2014 | Ram |
| 2014/0101134 A1 | 4/2014 | Bohrer et al. |
| 2014/0115182 A1 | 4/2014 | Sabaa et al. |
| 2014/0136810 A1 | 5/2014 | Colgrove et al. |
| 2014/0164618 A1 | 6/2014 | Alicherry et al. |
| 2014/0164701 A1 | 6/2014 | Guthrie et al. |
| 2014/0164709 A1 | 6/2014 | Guthrie et al. |
| 2014/0164710 A1 | 6/2014 | Ghat et al. |
| 2014/0165056 A1 | 6/2014 | Ghai et al. |
| 2014/0181085 A1 | 6/2014 | Gokhale et al. |
| 2014/0181398 A1 | 6/2014 | Bhat et al. |
| 2014/0189040 A1 | 7/2014 | Gero et al. |
| 2014/0189070 A1 | 7/2014 | Gero |
| 2014/0189071 A1 | 7/2014 | Leighton et al. |
| 2014/0189432 A1 | 7/2014 | Gokhale et al. |
| 2014/0189680 A1 | 7/2014 | Kripalani |
| 2014/0195551 A1 | 7/2014 | Colgrove et al. |
| 2014/0195749 A1 | 7/2014 | Colgrove et al. |
| 2014/0195762 A1 | 7/2014 | Colgrove et al. |
| 2014/0196033 A1 | 7/2014 | Bobroff et al. |
| 2014/0196037 A1 | 7/2014 | Gopalan |
| 2014/0196038 A1 | 7/2014 | Kottomtharayil et al. |
| 2014/0196039 A1 | 7/2014 | Kottomtharayil et al. |
| 2014/0196049 A1 | 7/2014 | Bobroff et al. |
| 2014/0196056 A1 | 7/2014 | Kottomtharayil et al. |
| 2014/0201137 A1 | 7/2014 | Vibhor et al. |
| 2014/0201140 A1 | 7/2014 | Vibhor et al. |
| 2014/0201141 A1 | 7/2014 | Vibhor et al. |
| 2014/0201142 A1 | 7/2014 | Varadharajan et al. |
| 2014/0201144 A1 | 7/2014 | Vibhor et al. |
| 2014/0201154 A1 | 7/2014 | Varadharajan et al. |
| 2014/0215155 A1 | 7/2014 | Miller et al. |
| 2014/0219037 A1 | 8/2014 | Mitani et al. |
| 2014/0244929 A1 | 8/2014 | Acharya et al. |
| 2014/0245016 A1 | 8/2014 | Desai et al. |
| 2014/0250093 A1 | 9/2014 | Prahlad et al. |

(56) References Cited

U.S. PATENT DOCUMENTS

| | | |
|---|---|---|
| 2014/0297734 A1 | 10/2014 | Lacapra |
| 2014/0304472 A1 | 10/2014 | Colgrove et al. |
| 2014/0304489 A1 | 10/2014 | Colgrove et al. |
| 2014/0310246 A1 | 10/2014 | Vijayan et al. |
| 2014/0310247 A1 | 10/2014 | Vijayan et al. |
| 2014/0310496 A1 | 10/2014 | Eguro et al. |
| 2014/0325170 A1 | 10/2014 | Aswathanarayana et al. |
| 2014/0337285 A1 | 11/2014 | Gokhale et al. |
| 2014/0337662 A1 | 11/2014 | Gokhale et al. |
| 2014/0337663 A1 | 11/2014 | Gokhale et al. |
| 2014/0337664 A1 | 11/2014 | Gokhale et al. |
| 2014/0344211 A1 | 11/2014 | Allan et al. |
| 2014/0344216 A1 | 11/2014 | Abercrombie et al. |
| 2014/0344718 A1 | 11/2014 | Rapaport et al. |
| 2014/0351214 A1 | 11/2014 | Abercrombie et al. |
| 2014/0351545 A1 | 11/2014 | Nakajima |
| 2014/0358944 A1 | 12/2014 | Brower, Jr. et al. |
| 2014/0365745 A1 | 12/2014 | Colgrove et al. |
| 2014/0372468 A1 | 12/2014 | Collins et al. |
| 2014/0372689 A1 | 12/2014 | Colgrove et al. |
| 2014/0372723 A1 | 12/2014 | Bobroff et al. |
| 2014/0379723 A1 | 12/2014 | Page et al. |
| 2015/0006728 A1 | 1/2015 | Parakh et al. |
| 2015/0006729 A1 | 1/2015 | Parakh et al. |
| 2015/0010143 A1 | 1/2015 | Yang |
| 2015/0012495 A1 | 1/2015 | Prahlad et al. |
| 2015/0019727 A1 | 1/2015 | Parakh et al. |
| 2015/0019732 A1 | 1/2015 | Parakh et al. |
| 2015/0052322 A1 | 2/2015 | Tsirkin et al. |
| 2015/0052323 A1 | 2/2015 | Noel et al. |
| 2015/0052523 A1 | 2/2015 | Raghu |
| 2015/0066784 A1 | 3/2015 | Powers |
| 2015/0067283 A1 | 3/2015 | Basu et al. |
| 2015/0067286 A1 | 3/2015 | Colgrove et al. |
| 2015/0074060 A1 | 3/2015 | Varadharajan et al. |
| 2015/0074064 A1 | 3/2015 | Goldberg et al. |
| 2015/0074536 A1 | 3/2015 | Varadharajan et al. |
| 2015/0106803 A1 | 4/2015 | Srivastava et al. |
| 2015/0134829 A1 | 5/2015 | Kruglick |
| 2015/0143037 A1 | 5/2015 | Smith |
| 2015/0143055 A1 | 5/2015 | Guthrie et al. |
| 2015/0153961 A1 | 6/2015 | Satoyama et al. |
| 2015/0154219 A1 | 6/2015 | Kruglick |
| 2015/0156174 A1 | 6/2015 | Fahey et al. |
| 2015/0160879 A1 | 6/2015 | Flynn et al. |
| 2015/0161267 A1 | 6/2015 | Sugawara et al. |
| 2015/0172120 A1 | 6/2015 | Dwarampudi et al. |
| 2015/0180891 A1 | 6/2015 | Seward et al. |
| 2015/0188823 A1 | 7/2015 | Williams et al. |
| 2015/0188943 A1 | 7/2015 | Williams et al. |
| 2015/0199265 A1 | 7/2015 | Kripalani |
| 2015/0199367 A1 | 7/2015 | Hammer et al. |
| 2015/0205817 A1 | 7/2015 | Kottomtharayil et al. |
| 2015/0212889 A1 | 7/2015 | Amarendran et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Kottomtharayil et al. |
| 2015/0227543 A1 | 8/2015 | Venkatesh et al. |
| 2015/0234669 A1 | 8/2015 | Ben-Yehuda et al. |
| 2015/0242227 A1 | 8/2015 | Nair |
| 2015/0242263 A1 | 8/2015 | Klose |
| 2015/0242264 A1 | 8/2015 | Vibhor et al. |
| 2015/0244775 A1 | 8/2015 | Vibhor et al. |
| 2015/0254088 A1 | 9/2015 | Chou et al. |
| 2015/0256617 A1 | 9/2015 | Klose et al. |
| 2015/0256639 A1 | 9/2015 | Chow et al. |
| 2015/0261439 A1 | 9/2015 | Kumar et al. |
| 2015/0261768 A1 | 9/2015 | Ahn et al. |
| 2015/0261776 A1 | 9/2015 | Attarde et al. |
| 2015/0261792 A1 | 9/2015 | Attarde et al. |
| 2015/0268864 A1 | 9/2015 | Bernat et al. |
| 2015/0268876 A1 | 9/2015 | Ahn et al. |
| 2015/0278024 A1 | 10/2015 | Barman et al. |
| 2015/0278037 A1 | 10/2015 | Wada |
| 2015/0278101 A1 | 10/2015 | Zhou et al. |
| 2015/0278812 A1 | 10/2015 | Partington et al. |
| 2015/0281360 A1 | 10/2015 | Lacapra |
| 2015/0286442 A1 | 10/2015 | Hudzia et al. |
| 2015/0286536 A1 | 10/2015 | Klose |
| 2015/0286537 A1 | 10/2015 | Klose |
| 2015/0293881 A1 | 10/2015 | Raikin et al. |
| 2015/0301108 A1 | 10/2015 | Hamid et al. |
| 2015/0301903 A1 | 10/2015 | Mutha et al. |
| 2015/0302120 A1 | 10/2015 | Hamid et al. |
| 2015/0302126 A1 | 10/2015 | Hamid et al. |
| 2015/0324236 A1 | 11/2015 | Gopalan et al. |
| 2015/0324255 A1 | 11/2015 | Kochunni et al. |
| 2015/0326481 A1 | 11/2015 | Rector |
| 2015/0339141 A1 | 11/2015 | Hogstrom et al. |
| 2015/0339166 A1 | 11/2015 | Hogstrom et al. |
| 2015/0350321 A1 | 12/2015 | Klose et al. |
| 2015/0363270 A1 | 12/2015 | Hammer |
| 2015/0363324 A1 | 12/2015 | Joshi et al. |
| 2015/0378704 A1 | 12/2015 | Davis |
| 2015/0378711 A1 | 12/2015 | Cameron et al. |
| 2015/0378712 A1 | 12/2015 | Cameron et al. |
| 2015/0378713 A1 | 12/2015 | Powell et al. |
| 2015/0378766 A1 | 12/2015 | Beveridge et al. |
| 2015/0378770 A1 | 12/2015 | Guthrie et al. |
| 2015/0378969 A1 | 12/2015 | Powell et al. |
| 2015/0379245 A1 | 12/2015 | Powell |

GANG MIGRATION OF VIRTUAL MACHINES USING CLUSTER-WIDE DEDUPLICATION

CROSS REFERENCE TO RELATED APPLICATIONS

The present application is Continuation of U.S. patent application Ser. No. 14/709,957, filed May 12, 2015, now U.S. Pat. No. 9,823,842, issued Nov. 21, 2017, which is a non-provisional of U.S. 61/992,037, filed May 12, 2014, the entirety of which are expressly incorporated herein by reference.

STATEMENT OF GOVERNMENT SUPPORT

This invention was made with government support under CNS-0845832 and CNS-0855204 awarded by the National Science Foundation. The government has certain rights in the invention.

FIELD OF THE INVENTION

The present invention relates to the field of gang migration, i.e. the simultaneous live migration of multiple virtual machines that run on multiple physical machines in a cluster.

BACKGROUND OF THE INVENTION

Live migration of a virtual machine (VM) refers to the transfer of a running VM over the network from one physical machine to another. Within a local area network (LAN), live VM migration mainly involves the transfer of the VM's CPU and memory state, assuming that the VM uses network attached storage, which does not require migration. Some of the key metrics to measure the performance of VM migration are as follows.

Total migration time is the time from the start of migration at the source to its completion at the target.
Downtime is the duration for which a VM's execution is suspended during migration.
Network traffic overhead is the additional network traffic due to VM migration.
Application degradation is the adverse performance impact of VM migration on applications running anywhere in the cluster.

The present invention relates to gang migration [8], i.e. the simultaneous live migration of multiple VMs that run on multiple physical machines in a cluster. The cluster, for example, may be assumed to have a high-bandwidth low-delay interconnect such has Gigabit Ethernet [10], 10GigE [9], or Infiniband [15], or the like. Datacenter administrators may need to perform gang migration to handle resource re-allocation for peak workloads, imminent failures, cluster maintenance, or powering down of several physical machines to save energy.

The present technology specifically focuses on reducing the network traffic overhead due to gang migration. Users and service providers of a virtualized infrastructure have many reasons to perform live VM migration such as routine maintenance, load balancing, scaling to meet performance demands during peak hours, and consolidation to save energy during non-peak hours by using fewer servers. Since gang migration can transfer hundreds of Gigabytes of data over the network, it can overload the core links and switches of the datacenter network. Gang migration can also adversely affect the performance at the network edges where the migration traffic competes with the bandwidth requirements of applications within the VMs. Reducing the network traffic overhead can also indirectly reduce the total time for migrating multiple VMs and the application degradation, depending upon how the traffic reduction is achieved.

The development of new techniques to improve the performance, robustness, and security of live migration of virtual machines (VM) [100] have emerged as one of the critical building blocks of modern cloud infrastructures due to cost savings, elasticity, and ease of administration. Virtualization technologies [118, 58, 79] have been rapidly adopted in large Infrastructure-as-a-Service (IaaS) platforms [46, 107, 111, 112] that offer cloud computing services on a utility-like model. Live migration of VMs [116, 5, 13] is a key feature and selling point for virtualization technologies.

Live VM migration mechanisms must move active VMs as quickly as possible and with minimal impact on the applications and the cluster infrastructure. These requirements translate into reducing the total migration time, downtime, application degradation, and cluster resource overheads such as network traffic, computation, memory, and storage overheads. Even though a large body of work in both industry and academia has advanced these goals, several challenges related to performance, robustness, and security remain to be addressed.

First, while the migration of a single VM has been well studied [74, 5, 18, 58, 129], the simultaneous migration of multiple VMs has not been thoroughly investigated. Secondly, the failure of the participating nodes during live VM migration and the resulting loss of VM state has not been investigated, even though high-availability solutions [130, 108] exist for steady-state VM operation.

Prior efforts to reduce the data transmitted during VM migration have focused on the live and non-live migration of a single VM [74, 5, 13, 133, 58, 129, 134, 95, 81, 123, 122, 135, 92, 94], live migration of multiple VMs running on the same physical machine [8], live migration of a virtual cluster across a wide-area network (WAN) [91], or non-live migration of multiple VM images across a WAN [57]. Numerous cluster job schedulers exist such as [136, 107, 137, 138, 139, 63, 109], among many others, as well as virtual machine management systems, such as VMWare's DRS [117], XenEnterprise [140], Usher [68], Virtual Machine Management Pack [141], and CoD [142] that let administrators control jobs/VM placement based on cluster load or specific policies such as affinity or anti-affinity rules.

SUMMARY OF THE INVENTION

The present technology seeks to focus on reducing the network traffic overhead due to gang migration. The present technology seeks, for example, to reduce the network traffic overhead uses the following observation. See, Deshpande, Umesh, et al. "Gang Migration of Virtual Machines using Cluster-wide Deduplication." *Cluster, Cloud and Grid Computing (CCGrid)*, 2013 13th IEEE/ACM International Symposium on. IEEE, 2013. (Applicant's prior work), expressly incorporated herein by reference.

VMs within a cluster often have similar memory content, given that they may execute the same operating system, libraries, and applications. Hence, a significant number of their memory pages may be identical [26], [30]. One can reduce the network overhead of gang migration using deduplication, i.e. by avoiding the transmission of duplicate copies of identical pages. We present an approach called gang migration using global (cluster-wide) deduplication (GMGD). During normal execution, a duplicate tracking mechanism keeps track of identical pages across different VMs in the cluster. During gang migration, a distributed coordination mechanism suppresses the retransmission of identical pages over the core links. Specifically, only one copy of each identical page is transferred to a target rack (i.e., the rack where a recipient physical machine for a VM resides). Thereupon, the machines within each target rack coordinate the exchange of necessary pages. In contrast to GMGD, gang migration using local deduplication (GMLD) [8] suppresses the retransmission of identical pages from among VMs within a single host.

The present technology therefore seeks to identify and track identical memory pages across VMs running on different physical machines in a cluster, including non-migrating VMs running on the target machines. These identical pages are deduplicated during gang migration, while keeping the coordination overhead low.

A prototype implementation of GMGD was created on the QEMU/KVM [18] platform, and evaluated on a 30-node cluster testbed having three switches, 10GigE core links and 1 Gbps edge links. GMGD was compared against two techniques—the QEMU/KVM's default live migration technique, called online compression (OC), and GMLD.

Prior efforts to reduce the data transmitted during VM migration have focused on live migration of a single VM [5], [20], [13], [16], live migration of multiple VMs running on the same physical machine (GMLD) [8], live migration of a virtual cluster across a wide-area network (WAN) [22], or non-live migration of multiple VM images across a WAN [17].

Compared to GMLD, GMGD faces the additional challenge of ensuring that the cost of global deduplication does not exceed the benefit of network traffic reduction during live migration. In contrast to migration over a WAN, which has high-bandwidth high-delay links, a datacenter LAN has high-bandwidth low-delay links. This difference is important because hash computations, which are used to identify and deduplicate identical memory pages, are CPU-intensive operations. When migrating over a LAN, hash computations become a serious bottleneck if performed online during migration, whereas over a WAN, the large round-trip latency can mask the online hash computation overhead.

Two lines of research are related to the present technologies—content deduplication among VMs and optimization of VM migration. Deduplication has been used to reduce the memory footprint of VMs in [3], [26], [19], [1], [29] and [11]. These techniques use deduplication to reduce memory consumption either within a single VM or between multiple co-located VMs. In contrast, the present technology uses cluster-wide deduplication across multiple physical machines to reduce the network traffic overhead when simultaneously migrating multiple VMs.

Non-live migration of a single VM can be speeded up by using content hashing to detect blocks within the VM image that are already present at the destination [23]. VMFlock [17] speeds up the non-live migration of a group of VM images over a high-bandwidth high-delay wide-area network by deduplicating blocks across the VM images. In contrast, the present technology focuses on reducing the network performance impact of the live and simultaneous migration of the memories of multiple VMs within a high-bandwidth low-delay datacenter network. Cloudnet [28] optimizes the live migration of a single VM over wide-area network. It reduces the number of pre-copy iterations by starting the downtime based on page dirtying rate and page transfer rate. [31] and [28] further use page-level deduplication along with the transfer of differences between dirtied and original pages, eliminating the need to retransmit the entire dirtied page. [16] uses an adaptive page compression technique to optimize the live migration of a single VM. Post-copy [13] transfers every page to the destination only once, as opposed to the iterative pre-copy [20], [5], which transfers dirtied pages multiple times. [14] employs low-overhead RDMA over Infiniband to speed up the transfer of a single VM. [21] excludes the memory pages of processes communicating over the network from being transferred during the initial rounds of migration, thus limiting the total migration time. [30] shows that there is an opportunity and feasibility for exploiting large amounts of content sharing when using certain benchmarks in high performance computing.

In the context of live migration of multiple VMs, prior work of the inventors on GMLD [8] deduplicates the transmission of identical memory content among VMs co-located within a single host. It also exploits sub-page level deduplication, page similarity, and delta difference for dirtied pages, all of which can be integrated into GMGD. Shrinker [22] migrates virtual clusters over high-delay links of WAN. It uses an online hashing mechanism in which hash computation for identifying duplicate pages (a CPU-intensive operation) is performed during the migration. The large round-trip latency of the WAN link masks the hash computation overhead during migration. A preferred embodiment employs offline hashing, rather than online hashing, because it was found that online hashing is impractical over low-delay links such as those in a Gigabit Ethernet LAN. In addition, issues such as desynchronizing page transfers, downtime synchronization, and target-to-target transfers need special consideration in a low-delay network. Further, when migrating a VM between datacenters over WAN, the internal topology of the datacenters may not be relevant. However, when migrating within a datacenter (as with GMGD), the datacenter switching topology and rack-level placement of nodes play important roles in reducing the traffic on core links. Preliminary results on this topic were published in a workshop paper [7] that focused upon the migration of multiple VMs between two racks.

The present technology therefore presents the comprehensive design, implementation, and evaluation of GMGD for a general cluster topology and also includes additional optimizations such as better downtime synchronization, improved target-to-target transfer, greater concurrency within the deduplication servers and per-node controllers, and more in-depth evaluations on a larger 30-node testbed.

In order to improve the performance, robustness, and security of VM migration beyond their current levels, one cannot simply treat each VM in isolation. Rather, the relationships between multiple VMs as well as their interaction with cluster-wide resources must be taken into account.

Simultaneous live migration of multiple VMs (gang migration), is a resource intensive operation that can adversely impact the entire cluster. Distributed deduplication may be used to reduce the network traffic overhead of migration and the total migration time on the core links of the datacenter LAN.

A distributed duplicate tracking phase identifies and tracks identical memory content across VMs running on same/different physical machines in a cluster, including non-migrating VMs running on the target machines. A distributed indexing mechanism computes content hashes on VMs' memory content on different machines and allows individual nodes to efficiently query and locate identical pages. A distributed hash table or a centralized indexing server may be provided, which have their relative merits and drawbacks. The former prevents a single point of bottleneck/failure, whereas the latter simplifies the overall indexing and lookup operation during runtime. Distributed deduplication during the migration phase may also be provided, i.e., to avoid the re-transmission of identical memory content, that was identified in the first step, during the simultaneous live migration of multiple VMs. The goal here is to reduce the network traffic generated by migration of multiple VMs by eliminating the re-transmission of identical pages from different VMs. Note that the deduplication operation would itself introduce control traffic to identify which identical pages have already been transferred from the source to the target racks. One of key challenges is to keep this control traffic overhead low, in terms of both additional bandwidth and latency introduced due to synchronization.

An important consideration in live VM migration is the robustness of the migration mechanism itself. Specifically, either the source or destination node can fail during migration. The key concern is whether the VM itself can be recovered after a failure of the source/destination nodes or any other component participating in the migration. Existing research has focused on high-availability solutions that focus on providing a hot-standby copy of a VM in execution. For instance, solutions such as [130, 108] perform high-frequency incremental checkpointing of a VM over the network using a technique similar to iterative pre-copy migration. However, the problem of recovering a VM after a failure during live migration has not been investigated. This problem is important because a VM is particularly vulnerable to failure during live migration. VM migration may last anywhere from a few seconds to several minutes, depending on a number of factors such as VM size and load on the cluster. During this time, a VM's state at the source and the destination nodes may be inconsistent, its state may be distributed across multiple nodes, and the software stack of a VM, including its virtual disk contents, may be in different stages of migration.

It is therefore an object to provide a system and method of tracking duplication of memory content in a plurality of servers, comprising: computing a hash value for each of a plurality of memory pages or sub-pages in each server; communicating the hash values to a deduplication server process executing on a server in the same rack; communicating from each respective deduplication server process of multiple racks to the respective deduplication server processes of other racks; and comparing the hash values at a deduplication server process to determine duplication of the memory pages or sub-pages. The plurality of memory pages or sub-pages may comprise a plurality of sub-pages each having a predetermined size.

It is a further object to provide a method of tracking duplication of memory content in a plurality of servers, each server having a memory pool comprising a plurality of memory pages and together residing in a common rack, comprising: computing a hash value for each of the plurality of memory pages or sub-pages in each server; communicating the hash values to a deduplication server process executing on a server in the common rack; receiving communications from respective deduplication server processes of multiple racks comprising respective hash values, to the deduplication server process executing in the server of the common rack; and comparing the respective hash values with the deduplication server process executing on the server in the common rack process to determine duplication of the memory pages or sub-pages between the plurality of servers in the common rack and the multiple racks.

It is also an object to provide a system and method for gang migration of a plurality of servers to a server rack having a network link external to the server rack and an internal data distribution system for communicating within the server rack, comprising: determining the content redundancy in the memory across a plurality of servers to be gang migrated; initiating a gang migration, wherein only a single copy of each unique memory page is transferred to the server rack during the gang migration, with a reference to the unique memory page for servers that require, but do not receive, a copy of the unique memory page; and after receipt of a unique memory page within the server rack, communicating the unique memory page to each server that requires but did not receive the copy of the unique memory page.

It is a still further object to provide a method for transfer of information to a plurality of servers in a server rack, comprising: determining the content redundancy in the memory across the plurality of servers; transferring a copy of each unique memory page or sub-page to the server rack; determining which of the plurality of servers in the server rack require the unique memory page or sub-page; and duplicating the unique memory page or sub-page within the server rack for each server that requires, but did not receive, the copy of the unique memory page or sub-page.

A single copy of each unique memory page or sub-page may be transferred to the server rack.

The copy of a respective unique memory page may be transferred to a respective server in the server rack, and the respective server may execute a process to copy the respective unique memory page for other servers within the server rack that require the respective unique memory page.

Each respective unique memory page may be associated with a hash that has a low probability of collision with hashes of distinct memory pages, and occupies less storage than the respective unique memory page itself, such that a respective unique memory page may be reliably identified by a correspondence of a hash of the respective unique memory page with an entry in a hash table.

The plurality of servers may be involved in a gang migration of a plurality of servers not in the server rack to the plurality of servers in the server rack. The live gang migration may comprise a simultaneous or concurrent migration of a plurality of live servers not in the rack whose live functioning may be assumed by the plurality of servers in the server rack, each live server having at least an associated central processing unit state and a memory state which may be transferred to a respective server in the server rack. The plurality of servers may host a plurality of virtual machines, each virtual machine having an associated memory space comprising memory pages. At least one virtual machine may use network attach storage.

The server rack may communicate with the plurality of servers not in the rack through a local area network.

The plurality of servers may be organized in a cluster, running a plurality of virtual machines, which communicate with each other using a communication medium selected from the group consisting of Gigabit Ethernet, 10GigE, or Infiniband.

The plurality of servers may implement a plurality of virtual machines, and the determination of the content redundancy in the memory across the plurality of servers may comprise determining, for each virtual machine, a hash for each memory page or sub-page used by the respective virtual machine.

The plurality of servers in the server rack may implement a plurality of virtual machines before the transferring, and suppress transmission of memory pages or sub-pages already available in the server rack during a gang migration.

The transferring may comprise selectively suppressing a transfer of memory pages or sub-pages already stored in the rack by a process comprising: computing in real time hashes of the memory pages or sub-pages in the rack; storing the hashes in a hash table; receiving a hash representing a memory page or sub-page of a virtual machine to be migrated to the server rack; comparing the received hash to the hashes in the hash table; if the hash does not correspond to a hash in the hash table and adding the hash of the memory page or sub-page of a virtual machine to be migrated to the server rack to the hash table, transferring the copy of the memory page or sub-page of a virtual machine to be migrated to the server rack; and if the hash corresponds to a hash in the hash table, duplicating the unique memory page or sub-page within the server rack associated with the entry in the hash table and suppressing the transferring of the copy of the memory page or sub-page of a virtual machine to be migrated to the server rack.

The transferring may be prioritized with respect to a memory page or sub-page dirtying rate.

The transferring may comprise a delta difference for dirtied memory pages or sub-pages.

The determination of the content redundancy in the memory across the plurality of servers may comprise a distributed indexing mechanism which computes content hashes on a plurality of respective virtual machine's memory content, and responds to a query with a location of identical memory content.

The distributed indexing mechanism may comprise a distributed hash table.

The distributed indexing mechanism may comprise a centralized indexing server.

A distributed deduplication process may be employed.

Each memory page or sub-page may have a unique identifier comprising a respective identification of an associated virtual machine, an identification of target server in the server rack, a page or sub-page offset and a content hash.

The method may further comprise maintaining a copy of a respective virtual machine outside the server rack until at least a live migration of the virtual machine may be completed.

The determination of which of the plurality of servers in the server rack require the unique memory page or sub-page comprises determining an SHA1 hash of each memory page, and storing the hash in a hash table along with a list of duplicate pages.

The information for transfer may be initially stored in at least one source server rack, having a plurality of servers, wherein each of the source server rack comprises a deduplication server which determines a hash of each memory page in the respective source server rack, storing the hashes of the memory pages in a hash table along with a list of duplicate pages, and controls a deduplicating of the memory pages or sub-pages within the source server rack before the transferring to the server rack. The deduplication server at a source server rack may receive from the server rack a list of servers in the server rack that require a copy of a respective memory page or sub-page. A server in the server rack may receive from the server rack a list of servers in the server rack that require a copy of a respective memory page or sub-page, retrieve a copy of the respective memory page or sub-page, send a copy of the retrieved memory page or sub-page to each server in the server rack that requires a copy of the memory page or sub-page, and mark the page as having been sent in the hash table. The list of servers may be sorted in order of most recently changed memory page, and after a memory page or sub-page is marked as having been sent, references to earlier versions of that memory page or sub-page are removed from the list without overwriting the more recent copy of the memory page or sub-page.

The transfer of information may be part of a live gang migration of virtual machines, executing on at least one source rack, wherein a virtual machine executing on the at least one source rack remains operational until at least one version of each memory page of the virtual machine is transferred to the server rack, the virtual machine is then inactivated, subsequently changed versions of memory pages or sub-pages are transferred, and the corresponding virtual machine on the server rack is then activated.

The server rack may employ memory deduplication for the plurality of servers during operation.

Each of a plurality of virtual machines may transfer memory pages or sub-pages to the server rack in desynchronized manner to avoid a race condition wherein different copies of the same page from different virtual machines are sent to the server rack concurrently.

DETAILED DESCRIPTION OF THE PREFERRED EMBODIMENT

Architecture of GMGD

VMs are live migrated from one rack of machines to another rack using GMGD. For each VM being migrated, the target physical machine is provided as an input to GMGD. Target mapping of VMs could be provided by another VM placement algorithm that maximizes some optimization criteria such as reducing inter-VM communication overhead [27] or maximizing the memory sharing potential [29]. GMGD does not address the VM placement problem nor does it assume the lack or presence of any inter-VM dependencies.

Figure 1:
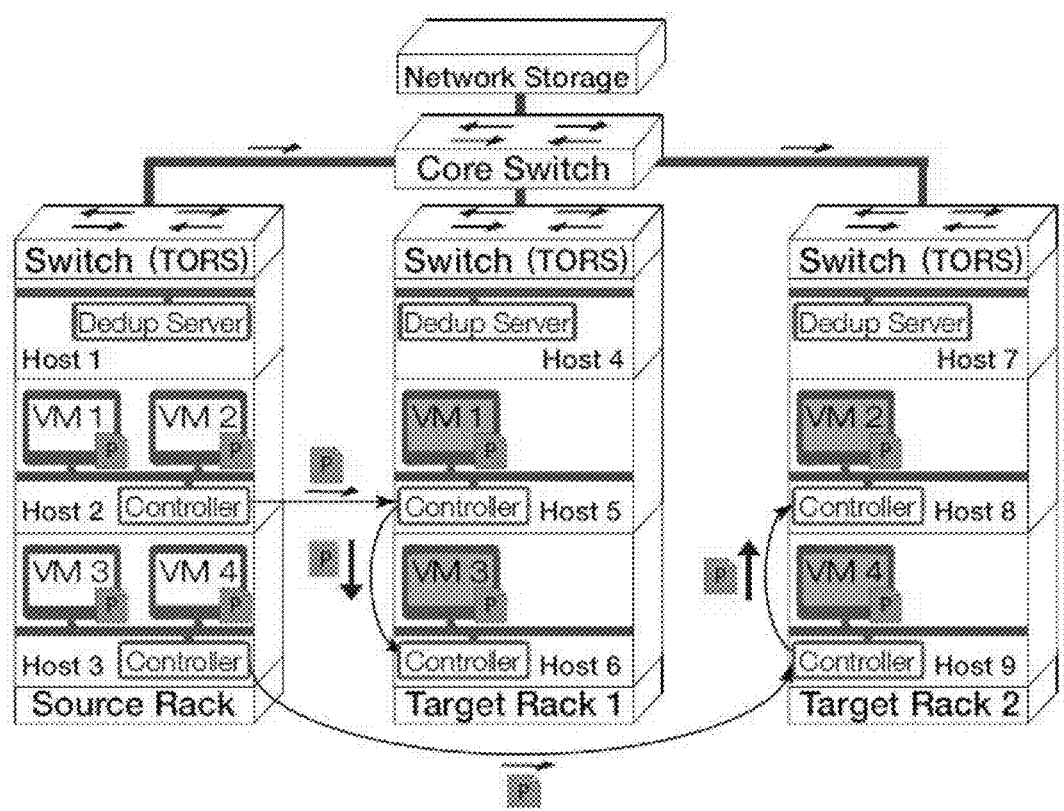
FIG. 1 shows an illustration of GMGD, in which Page P is identical among all four VMs at the source rack, VM1 and VM3 are being migrated to target rack 1, VM2 and VM4 are being migrated to target rack 2, one copy of P is sent to host 5 which forwards P to host 6 in target rack 1, and another copy of P is sent to host 9 which forwards P to host 8 in target rack 2, so that identical pages headed for same target rack are sent only once per target rack over core network.

As shown in FIG. 1, a typical cluster consists of multiple racks of physical machines. Machines within a rack are connected to a top-of-the-rack (TOR) switch. TOR switches are connected to one or more core switches using high-bandwidth links (typically 10 Gbps or higher). GMGD does not preclude the use of other layouts where the core network could become overloaded.

Migrating VMs from one rack to another increases the network traffic overhead on the core links. To reduce this overhead, GMGD employs a cluster-wide deduplication mechanism to identify and track identical pages across VMs running on different machines. As illustrated in FIG. 1, GMGD identifies the identical pages from VMs that are being migrated to the same target rack and transfers only one copy of each identical page to the target rack. At the target rack, the first machine to receive the identical page transfers the page to other machines in the rack that also require the page. This prevents duplicate transfers of an identical page over the core network to the same target rack.

As shown in FIG. 1, page P is identical among all four VMs at the source rack. VM1 and VM3 are being migrated to target rack 1. VM2 and VM4 are being migrated to target rack 2. One copy of P is sent to host 5 which forwards P to host 6 in target rack 1. Another copy of P is sent to host 9 which forwards P to host 8 in target rack 2. Thus, identical pages headed for same target rack are sent only once per target rack over the core network.

In the prototype, GMGD was implemented within the default pre-copy mechanism in QEMU/KVM. The pre-copy [5] VM migration technique transfers the memory of a running VM over the network by performing iterative passes over its memory. Each successive round transfers the pages that were dirtied by the VM in the previous iteration. Such iterations are carried out until a very small number of dirty pages are left to be transferred. Given the throughput of the network, if the time required to transfer the remaining pages is smaller than a pre-determined threshold, the VM is paused and its CPU state and the remaining dirty pages are transferred. Upon completion of this final phase, the VM is resumed at the target. For GMGD each VM is migrated independently with the pre-copy migration technique. Although the GMGD prototype is based on pre-copy VM migration, nothing in its architecture prevents GMGD from working with other live VM migration techniques such as post-copy [13].

Two phases of GMGD are now described, namely duplicate tracking and live migration.

A. Duplicate Tracking Phase

This phase is carried out during the normal execution of VMs at the source machines before the migration begins. Its purpose is to identify all duplicate memory content (presently at the page-level) across all VMs residing on different machines. We use content hashing to detect identical pages. The pages having the same content yield the same hash value. When the hashing is performed using a standard 160-bit SHA1 hash [12], the probability of collision is less than the probability of an error in memory or in a TCP connection [4].

In each machine, a per-node controller process coordinates the tracking of identical pages among all VMs in the machine. The per-node controller instructs a user-level QEMU/KVM process associated with each VM to scan the VM's memory image, perform content based hashing and record identical pages. Since each VM is constantly executing, some of the identical pages may be modified (dirtied) by the VM, either during the hashing, or after its completion. To identify these dirtied pages, the controller uses the dirty logging mode of QEMU/KVM. In this mode, all VM pages are marked as read-only in the shadow page table maintained by the hypervisor. The first write attempt to any read-only page results in a trap into the hypervisor which marks the faulted page as dirty in its dirty bitmap and allows the write access to proceed. The QEMU/KVM process uses a hypercall to extract the dirty bitmap from KVM to identify the modified pages.

The per-rack deduplication servers maintain a hash table, which is populated by carrying out a rack-wide content hashing of the 160-bit hash values pre-computed by per-node controllers. Each hash is also associated with a list of hosts in the rack containing the corresponding pages. Before migration, all deduplication servers exchange the hash values and host list with other deduplication servers.

B. Migration Phase

In the migration phase, all VMs are migrated in parallel to their destination machines. The pre-computed hashing information is used to perform the deduplication of the transferred pages at both the host and the rack levels. QEMU/KVM queries the deduplication server for its rack to acquire the status of each page. If the page has not been transferred already by another VM, then its status is changed to send and it is transferred to the target QEMU/KVM. For subsequent instances of the same page from any other VM migrating to the same rack, QEMU/KVM transfers the page identifier. Deduplication servers also periodically exchange the information about the pages marked as sent, which allows the VMs in one rack to avoid retransmission of the pages that are already sent by the VMs from another rack.

C. Target-Side VM Deduplication

The racks used as targets for VM migration are often not empty. They may host VMs containing pages that are identical to the ones being migrated into the rack. Instead of transferring such pages from the source racks via the core links, they are forwarded within the target rack from the hosts running the VMs to the hosts receiving the migrating VMs. The deduplication server at the target rack monitors the pages within hosted VMs and synchronizes this information with other deduplication servers. Per-node controllers perform this forwarding of identical pages among hosts in the target rack.

D. Reliability

When a source host fails during migration, the reliability of GMGD is no worse than that of single-VM pre-copy in that only the VMs running on the failed source hosts will be lost, whereas other VMs can continue migrating successfully. However, when a target host fails during migration, or if a subset of its pages are corrupted during migration, then MGD has an additional point of potential failure arising from deduplication. Specifically more VMs may suffer collateral damage using GMGD than using single-VM pre-copy. This is because each deduplicated page temporarily resides at an intermediate node in the target rack till it is pushed to all the VMs that need that identical page. If the intermediate node fails, then all the deduplicated pages it holds are lost and, consequently, all the VM that need those pages will fail. Since each deduplicated page, by definition, is needed by multiple VMs, the magnitude of failure will be far greater than without deduplication. Two solutions are available for this problem. (a) Replication: Host each deduplicated page at two (or more) distinct nodes on the target rack. Alternatively, to conserve memory, the deduplicated page could be asynchronously replicated to a network-attached storage server, if the server offers enough bandwidth to keep up. (b) Parity: Maintain parity information for stripes of deduplicated pages, in much that same way that a RAID system computes parity across disk blocks on multiple disks. (c) Retransmission: The source hosts can resend copies of the lost pages from when an intermediate host fails.

Implementation Details

A prototype of GMGD was implemented in the QEMU/KVM virtualization environment. The implementation is completely transparent to the users of the VMs. With QEMU/KVM, each VM is spawned as a process on a host machine. A part of the virtual address space of the QEMU/KVM process is exported to the VM as its physical memory.

A. Per-Node Controllers

Per-node controllers are responsible for managing the deduplication of outgoing and incoming VMs. We call the controller component managing the outgoing VMs as the source side and the component managing the incoming VMs as the target side. The controller sets up a shared memory region that is accessible only by other QEMU/KVM processes. The shared memory contains a hash table which is used for tracking identical pages. Note that the shared memory poses no security vulnerabilities because it is outside the physical memory region of the VM in the QEMU/KVM process' address space and is not accessible by the VM itself.

The source side of the per-node controller coordinates the local deduplication of memory among co-located VMs. Each QEMU/KVM process scans its VM's memory and calculates a 160-bit SHA1 hash for each page. These hash values are stored in the hash table, where they are compared against each other. A match of two hash values indicates the existence of two identical pages. Scanning is performed by a low priority thread to minimize interference with the VMs' execution.

The target side of the per-node controller receives incoming identical pages from other controllers in the rack. It also forwards the identical pages received on behalf of other machines in the rack to their respective controllers. Upon reception of an identical page, the controller copies the page into the shared memory region, so that it becomes available to incoming VMs. The shared memory region is freed once the migration is complete.

B. Deduplication Server

Deduplication servers are to per-node controllers what per-node controllers are to VMs. Each rack contains a deduplication server that tracks the status of identical pages among VMs that are migrating to the same target rack and the VMs already at the target rack. Deduplication servers maintain a content hash table to store this information. Upon reception of a 160-bit hash value from the controllers, the last 32-bits of the 160-bit hash are used to find a bucket in the hash table. In the bucket, the 160-bit hash entry is compared against the other entries present. If no matching entry is found, a new entry is created.

Each deduplication server can currently process up to 200,000 queries per second over a 1 Gbps link. This rate can potentially handle simultaneous VM migrations from up to 180 physical hosts. For context, common 19-inch racks can hold 44 servers of 1 U (1 rack unit) height [25]. A certain level of scalability is built into the deduplication server, by using multiple threads for query processing, fine-grained reader/writer locks, and batching queries from VMs to reduce the frequency of communication with the deduplication server. Finally, the deduplication server does not need to be a separate server per rack. It can potentially run as a background process within one of the machines in the rack that also runs VMs provided that a few spare CPU cores are available for processing during migration.

Dirty pages and unique pages that have no match with other VMs are transferred in their entirety to the destination.

Figure 2:
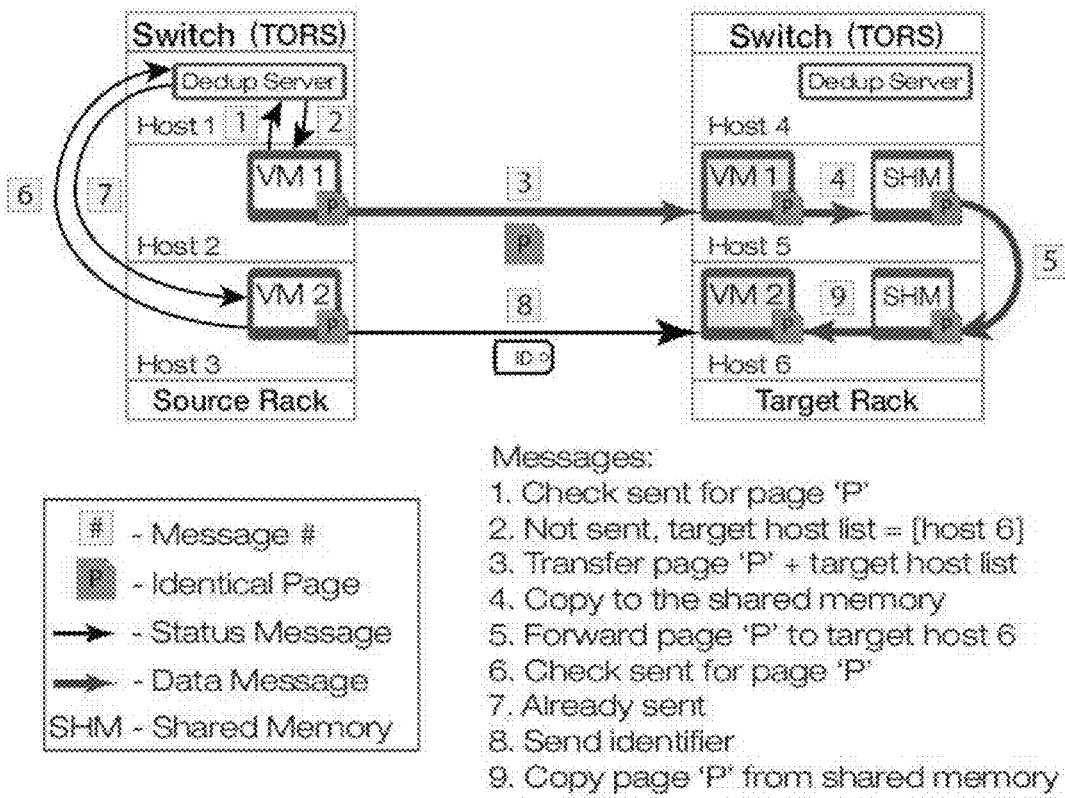
FIG. 2 shows deduplication of identical pages during migration.

FIG. 2 shows the message exchange sequence between the deduplication servers and QEMU/KVM processes for an inter-host deduplication of page P.

C. Operations at the Source Machine

Upon initiating simultaneous migration of VMs, the controllers instruct individual QEMU/KVM processes to begin the migration. From this point onward, the QEMU/KVM processes communicate directly with the deduplication servers, without any involvement from the controllers. After commencing the migration, each QEMU/KVM process starts transmitting every page of its respective VM. For each page it checks in the local hash table whether the page has already been transferred. Each migration process periodically queries its deduplication server for the status of next few pages it is about to transfer. The responses from the deduplication server are stored in the hash table, in order to be accessible to the other co-located VMs. If the QEMU/KVM process discovers that a page has not been transferred, then it transmits the entire page to its peer QEMU/KVM process at the target machine along with its unique identifier. QEMU/KVM at the source also retrieves from the deduplication server a list of other machines in the target rack that need an identical page. This list is also sent to the target machine's controller, which then retrieves the page and sends it to the machines in the list. Upon transfer the page is marked as sent in the source controller's hash table.

The QEMU/KVM process periodically updates its deduplication server with the status of the sent pages. The deduplication server also periodically updates other deduplication servers with a list of identical pages marked as sent by hosts other than the source host. Handling of such pages, known as remote pages, is discussed below.

D. Operations at the Target Machine

On the target machine, each QEMU/KVM process allocates a memory region for its respective VM where incoming pages are copied. Upon reception of an identical page, the target QEMU/KVM process copies it into the VM's memory and inserts it into the target hash table according to its identifier.

If only an identifier is received, a page corresponding to the identifier is retrieved from the target hash table, and copied into the VM's memory. Unique and dirty pages are directly copied into the VM's memory space. They are not copied to the target shared memory.

E. Remote Pages

Remote pages are deduplicated pages that were transferred by hosts other than the source host. Identifiers of such pages are accompanied by a remote flag. Such pages become available to the waiting hosts in the target rack only after the carrying host forwards them. Therefore, instead of searching for such remote pages in the target hash table immediately upon reception of an identifier, the identifier and the address of the page are inserted into a per-host waiting list.

A per-QEMU/KVM process thread, called a remote thread, periodically traverses the list, and checks for each entry whether the page corresponding to the identifier has been added into the target shared memory. The received pages are copied into the memory of the respective VMs after removing the entry from the list. Upon reception of a more recent dirtied copy of the page whose entry happens to be on the waiting list, the corresponding entry is removed from the list to prevent the thread from over-writing the page with its stale copy.

The identical pages already present at the target rack before the migration are also treated as the remote pages. The per-node controllers in the target rack forward such pages to the listed target hosts. This avoids their transmission over the core network links from the source racks. However, pages dirtied by VMs running in the target rack are not forwarded to other hosts, instead they are requested by the corresponding hosts from their respective source hosts.

F. Coordinated Downtime Start

A VM cannot be resumed at the target unless all of its pages have been received. Therefore initiating the VM's downtime before completing target-to-target transfers can increase its downtime. However, in the default QEMU/KVM migration technique, downtime is started at the source's discretion and the decision is made solely on the basis of the number of pages remaining to be transferred and the perceived link bandwidth at the source. Therefore, to avoid the overlap between the downtime and target-to-target transfers, a co-ordination mechanism is implemented between the source and the target of each QEMU/KVM process. The source QEMU/KVM process is prevented from starting the VM downtime and to keep it in the live pre-copy iteration mode until all of its pages have been retrieved at the target and copied into memory. Thereon, the source is instructed by the target to initiate the downtime. This allows VMs to reduce their downtime, as only the remaining dirty pages at the source are transferred during the downtime. While the source side waits for a permission to initiate the downtime, the VM may dirty more pages. Hence, depending on its dirtying rate, the transfer of additional dirty pages may lead to an increase in the amount of data transferred and hence the total migration time.

It is noted that, although not implemented in the prototype, memory pages for the rack (or data center) may be stored in a deduplicated virtual memory environment, such that redundant memory pages are not duplicated after receipt within the rack except at a cache memory level, but rather the memory pages are retrieved from a memory server, such as MemX, when needed. See, each of which is expressly incorporated herein by reference in its entirety: [7, 8, 19, 22, 30, 31, 75, 121, 145, 165, 174-187].

In some cases, the system may be implemented to segregate information stored in memory as either implementation-specific pages, in which the likelihood of duplication between VMs is high, and data-specific pages, which are unlikely to contain duplicate information. In this way, pages which are hybrid or heterogeneous are avoided, thus increasing efficiency of the virtual memory traffic usage. Likewise, in a transaction processing system, the data specific pages are likely to be short-lived, and therefore greater efficiency may be achieved by avoiding virtual memory overhead by removing this data from local memory storage, and allowing these pages to expire or be purged in local memory. On the other hand, pages that are common for multiple servers, but rarely used, may be efficiently and effectively stored remotely, and as discussed above, gang migrated without massive redundant data transfers.

G. Desynchronizing Page Transfers

An optimization was also implemented to improve the efficiency of deduplication. There is a small time lag between the transfer of an identical page by a VM and the status of the page being reflected at the deduplication server. This lag can result in duplicate transfer of some identical pages if two largely identical VMs start migration at the same time and transfer their respective memory pages in the same order of page offsets. To reduce the likelihood of such duplicate transfers, each VM transfers pages in different order depending upon their assigned VM number. With desynchronization, identical memory regions from different VMs are transferred at different times, allowing each QEMU/KVM process enough time to update the deduplication servers about the sent pages before other VMs transfer the same pages.

Evaluation

The GMGD implementation was evaluated in a 30-node cluster testbed having high-bandwidth low-delay Gigabit Ethernet. Each physical host has two quad-core 2 GHz CPUs, 16 GB of memory, and 1 Gbps network card.

Figure 3:
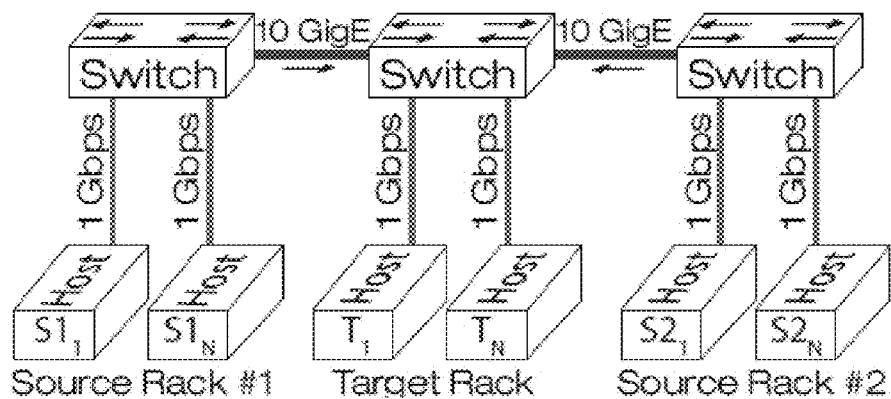
FIG. 3 shows a layout of the evaluation testbed.

FIG. 3 shows the layout of the cluster testbed consisting of three racks, each connected to a different top of rack (TOR) Ethernet switch. The TOR switches are connected to each other by a 10GigE optical link, which acts as the core link. GMGD can, of course, be used on larger topologies. Live migration of all VMs is initiated simultaneously and memory pages from the source hosts traverse the 10GigE optical link between the switches to reach the target hosts. For most of the experiments, each machine hosts four VMs and each VM has 2 virtual CPUs (VCPUs) and 1 GB memory.

GMGD was compared against the following VM migration techniques:

(1) Online Compression (OC): This is the default VM migration technique used by QEMU/KVM. Before transmission, it compresses pages that are filled with uniform content (primarily pages filled with zeros) by representing the entire page with just one byte. At the target, such pages are reconstructed by filling an entire page with the same byte. Other pages are transmitted in their entirety to the destination.

(2) Gang Migration with Local Deduplication (GMLD): [8] This technique uses content hashing to deduplicate the pages across VMs co-located on the same host. Only one copy of identical pages is transferred from the source host.

In initial implementations of GMGD, the use of online hashing was considered, in which hash computation and deduplication are performed during migration (as opposed to before migration). Hash computation is a CPU-intensive operation. In evaluations, it was found that the online hashing variant performed very poorly, in terms of total migration time, on high-bandwidth low-delay Gigabit Ethernet. For example, online hashing takes 7.3 seconds to migrate a 1 GB VM and 18.9 seconds to migrate a 4 GB VM, whereas offline hashing takes only 3.5 seconds and 4.5 seconds respectively. CPU-heavy online hash computation became a performance bottleneck and, in fact, yielded worse total migration times than even the simple OC technique described above. Given that the total migration time of online hashing variant is considerably worse than offline hashing while achieving only comparable savings in network traffic, the results for online hashing are omitted in the experiments reported below.

A. Network Load Reduction

Figure 4:
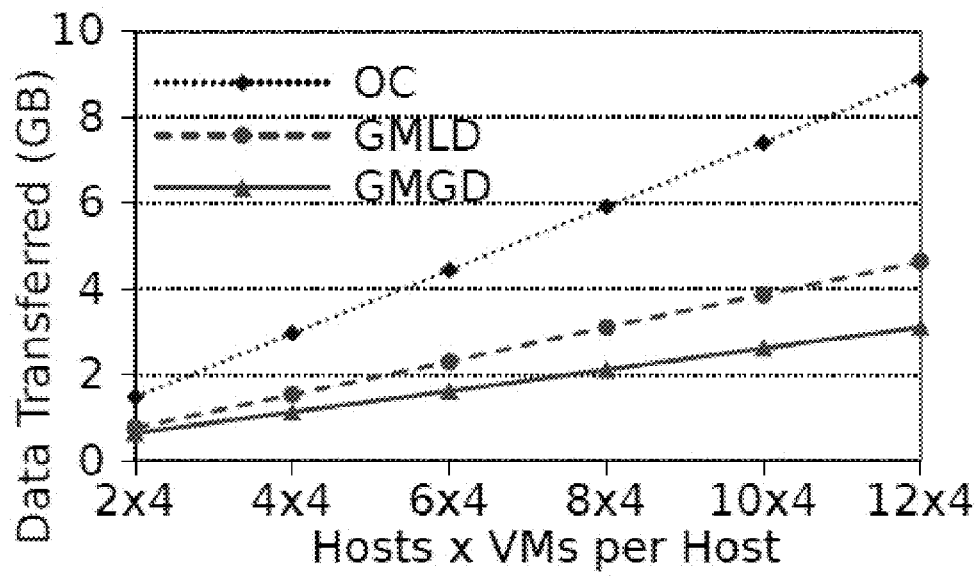
FIG. 4 shows network traffic on core links when migrating idle VMs.

1) Idle VMs: An equal number of VMs from each of the two source racks, i.e. for 12×4 configuration, 4 VMs are migrated from each of the 6 hosts on each source rack. FIG. 4 shows the amount of data transferred over the core links for the three VM migration schemes with an increasing number of hosts, each host running four 1 GB idle VMs. Since every host runs identical VMs, the addition of each host contributes a fixed number of unique and identical pages. Therefore for all three techniques, the linear trend is observed. Among them, since OC only optimizes the transfer of uniform pages, a set that mainly consists of zero pages, it transfers the highest amount of data. GMLD also deduplicates zero pages in addition to the identical pages across the co-located VMs. As a result, it sends less data than OC. GMGD transfers the lowest amounts of data. For 12 hosts, GMGD transfers 65% and 33% less data through the core links than OC and GMLD respectively.

2) Busy VMs: To evaluate the effect of busy VMs on the amount of data transferred during their migration, Dbench

Figure 5:
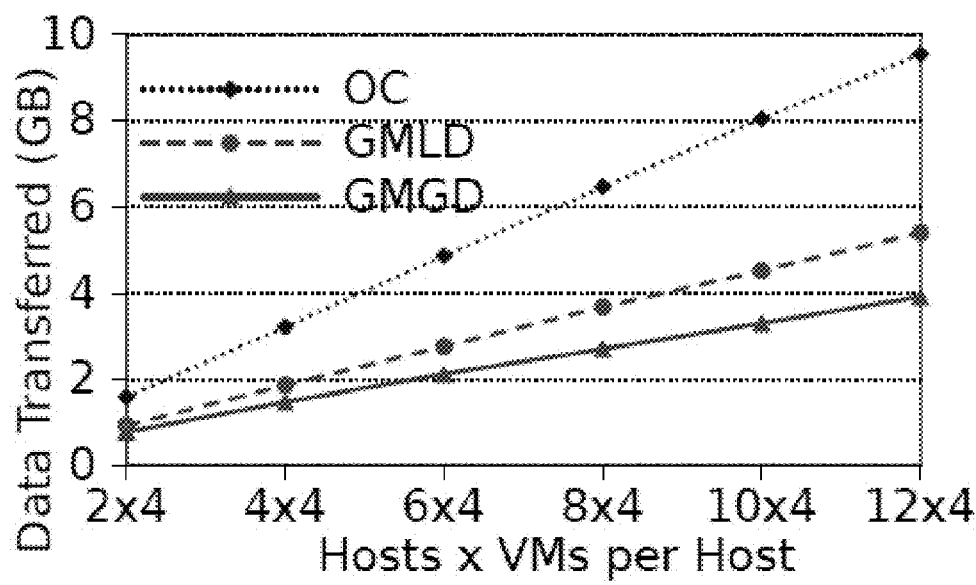
FIG. 5 shows network traffic on core links when migrating busy VMs.

[6], a filesystem benchmark, is run inside VMs. Dbench performs file I/O on a network attached storage. It provides an adversarial workload for GMGD because it uses the network interface for communication and DRAM as a buffer. The execution of Dbench is initiated after the deduplication phase of GMGD to ensure that the memory consumed by Dbench is not deduplicated. The VMs are migrated while execution of Dbench is in progress. FIG. 5 shows that GMGD yields up to 59% reduction in the amount of data transferred over OC and up to 27% reduction over GMLD.

B. Total Migration Time

1) Idle VMs: To measure the total migration time of different migration techniques, the end-to-end (E2E) total migration time is measured, i.e. the time taken from the start of the migration of the first VM to the end of the migration of the last VM. Cluster administrators may be concerned with E2E total migration time of groups of VMs since it measures the time for which the migration traffic occupies the core links.

The idle VM section of Table I shows the total migration time for each migration technique with an increasing number of hosts containing idle VMs. Note that even with the maximum number of hosts (i.e. 12 with 6 from each source rack), the core optical link remains unsaturated. Therefore, for each migration technique, nearly constant total migration time is observed, irrespective of the number of hosts. Further, among all three techniques, OC has highest total migration time for any number of hosts, which is proportional to the amount of data it transfers. GMGD's total migration time is slightly higher than that of GMLD, approximately 5% higher for 12 hosts. The difference between the total migration time of GMGD and GMLD can be attributed to the overhead associated with GMGD for performing deduplication across the hosts. While the migration is in progress, it queries with the deduplication server to read, or update the status of deduplicated pages. Such requests need to be sent frequently for effective deduplication.

TABLE I

Total migration time (in seconds)

| | Idle VMs | | | Busy VMs | | |
|---|---|---|---|---|---|---|
| Hosts × VMs | OC | GMLD | GMCD | OC | GMLD | GMCD |
| 2 × 4 | 7.28 | 3.79 | 3.88 | 8.6 | 5.17 | 4.93 |
| 4 × 4 | 7.36 | 3.89 | 4.08 | 8.74 | 5.10 | 5.06 |
| 6 × 4 | 7.39 | 3.92 | 4.17 | 8.69 | 5.15 | 5.01 |
| 8 × 4 | 7.11 | 4.12 | 4.16 | 8.77 | 5.13 | 4.90 |
| 10 × 4 | 7.38 | 4.08 | 4.27 | 8.75 | 5.18 | 4.91 |
| 12 × 4 | 7.40 | 4.05 | 4.27 | 8.53 | 5.06 | 4.98 |

2) Busy VMs: Table I shows that Dbench increases the total migration time of all the VM migration techniques compared to their idle VM migration times. Since the Dbench traffic competes with the migration traffic for the source network interface card (NIC), the total migration time of each technique is proportional to the amount of data it transfers. Therefore GMGD's total migration time is slightly lower than that of GMLD.

C. Downtime

Figure 6:
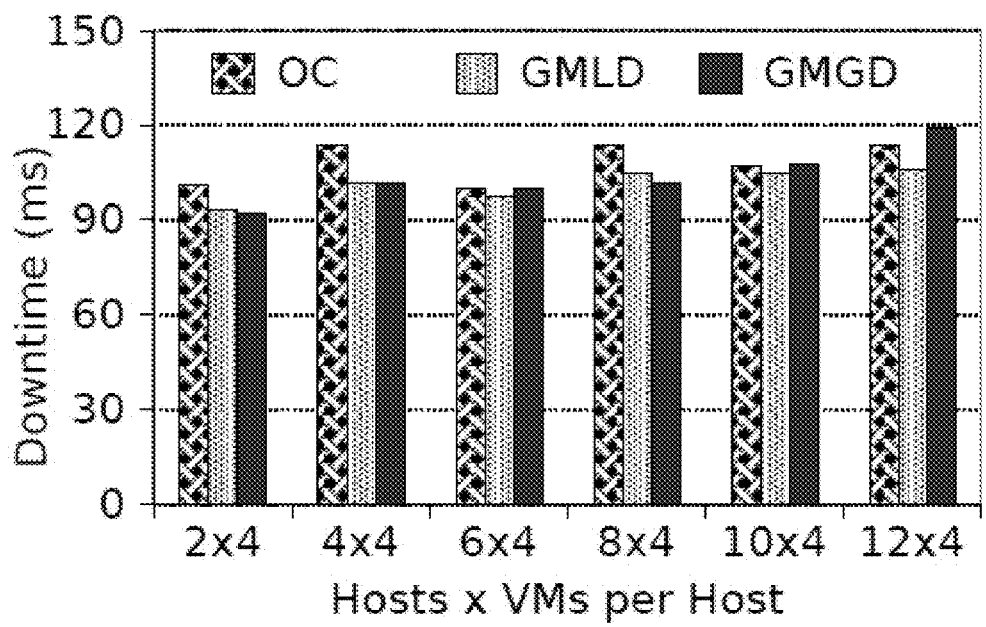
FIG. 6 shows a downtime comparison.

FIG. 6 shows that increasing the number of hosts does not have a significant impact on the downtimes for all three schemes. This is because each VM's downtime is initiated independently of other VMs. Downtime of all the techniques is in the range of 90 ms to 120 ms.

D. Background Traffic

In datacenters, the switches along the migration path of VMs may experience network traffic other than the VM migration traffic. In overloaded switches, the VM migration traffic may impact the performance of applications running across the datacenter, and vice versa. The effect of background network traffic is first compared on different migration techniques. Conversely, the effect of different migration techniques is also compared on other network-bound applications in the cluster. For this experiment, the 10GigE core link between the switches is saturated with VM migration traffic and background network traffic. 8 Gbps of background Netperf [2] UDP traffic is transmitted between two source racks such that it competes with the VM migration traffic on the core link.

Figure 7:
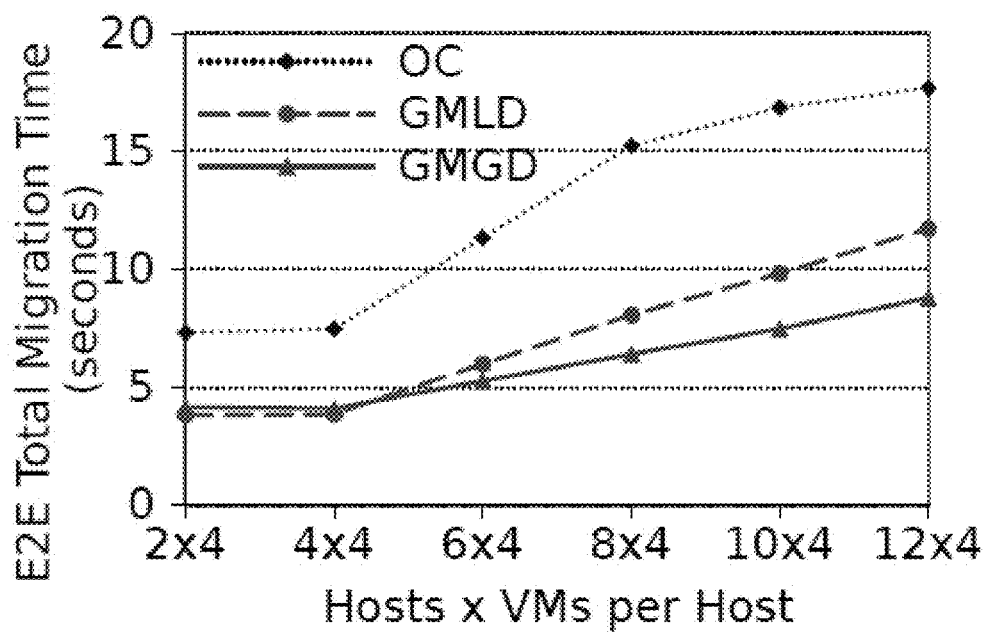
FIG. 7 shows total migration time with background traffic.

FIG. 7 shows the comparison of total migration time with UDP background traffic for the aforementioned setup. With an increasing number of VMs and hosts, the network contention and packet loss on the two 10GigE core links also increases. A larger total migration time is observed for all three techniques compared to the corresponding idle VM migration times listed in Table I. However, observe that GMGD has lower total migration time than both OC and GMLD, in contrast to Table I where GMGD had higher TMT compared to GMLD. This is because, in response to packet loss at the core link, all VM migration sessions (which are TCP flows) backoff. However, the backoff is proportional to the amount of data transmitted by each VM migration technique. Since GMGD transfers less data, it suffers less from TCP backoff due to network congestion and completes the migration faster.

Figure 8:
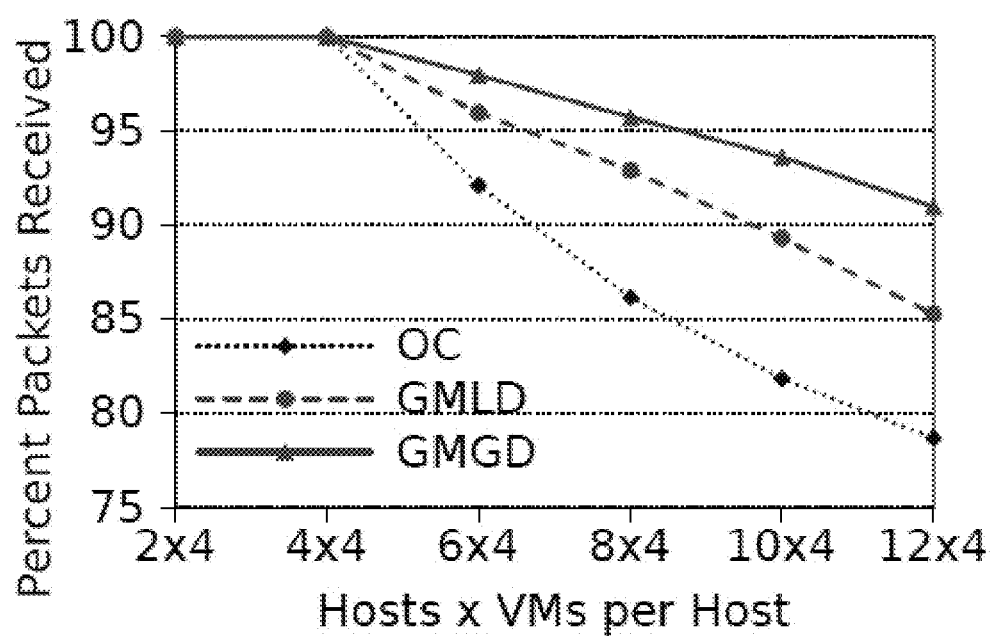
FIG. 8 shows background traffic performance.

FIG. 8 shows the converse effect, namely, the impact of VM migration on the performance of Netperf. With an increasing number of migrating VMs, Netperf UDP packet losses increase due to network contention. For 12 hosts, GMGD receives 15% more packets than OC and 7% more UDP packets than GMLD.

E. Application Degradation

Table II compares the degradation of applications running inside the VMs during migration using 12×4 configuration.

TABLE II

Application degradation in migrating 48 VMs.

| Benchmarks | w/o Migration | OC | GMLD | GMGD |
|---|---|---|---|---|
| Sysbench (trans/sec) | 31.08 | 19.32 | 22.25 | 26.15 |
| TCP-RR (trans/sec) | 1271.6 | 515.7 | 742.7 | 888.33 |
| Sum of subsets (sec) | 6.68 | 7.07 | 7.07 | 7.06 |

Sysbench: Here, the impact of migration on the performance of I/O operations from VMs in the above scenario is evaluated. A Sysbench [24] database is hosted on a machine located outside the source racks and connected to the switch with a 1 Gbps Ethernet link. Each VM performs transactions on the database over the network. The VMs are migrated while the benchmark is in progress to observe the effect of migration on the performance of the benchmark. Table II shows the average transaction rate per VM for Sysbench.

TCP_RR: The Netperf TCP_RR VM workload is used to analyze the effect of VM migration on the inter-VM communication. TCP_RR is a synchronous TCP request-response test. 24 VMs from 6 hosts are used as senders, and 24 VMs from the other 6 hosts as receivers. The VMs are migrated while the test is in progress and the performance of TCPRR measured. Table II shows the average transaction rate per sender VM. Due to the lower amount of data transferred through the source NICs, GMGD keeps the NICs available for the inter-VM TCP_RR traffic. Consequently, it least affects the performance of TCP_RR and gives the highest number of transactions per second among the three.

Sum of Subsets: Thistle is a CPU-intensive workload that, given a set of integers and an integer k, finds a non-empty subset that sum to k. This program is run in the VMs during their migration to measure the average per-VM completion time of the program. Due to the CPU-intensive nature of the workload, the difference in the completion time of the application with the three migration techniques is insignificant.

F. Performance Overheads

Duplicate Tracking: Low priority threads perform hash computation and dirty-page logging in the background. With 4 VMs and 8 cores per machine, a CPU-intensive workload (sum of subsets) experienced 0.4% overhead and a write-intensive workload (random writes to memory) experienced 2% overhead. With 8 VMs per machine, the overheads were 6% and 4% respectively due to CPU contention.

Worst-case workload: To evaluate the VM migration techniques against a worst-case workload, a write-intensive workload is run inside VMs that reduces the likelihood of deduplication by modifying two times as much data as the size of each VM. GMGD does not introduce any observed additional overheads, compared against OC and GMLD.

Space overhead: At the source side, the shared memory region for local deduplication contains a 160-bit hash value for each VM page. In the worst case when all VM pages are unique, the source side space consumption is around 4% of the aggregate memory of VMs. At the target side, the worst-case space overhead in the shared memory could be 100% of the aggregate memory of VMs when each page has exactly one identical counterpart on another host. However, target shared memory only contains identical pages. Unique pages are directly copied into VMs' memories, so they do not incur any space overhead. Further, both the source and the target shared memory areas are used only during the migration and are freed after the migration completes.

Hardware Overview

Figure 9:
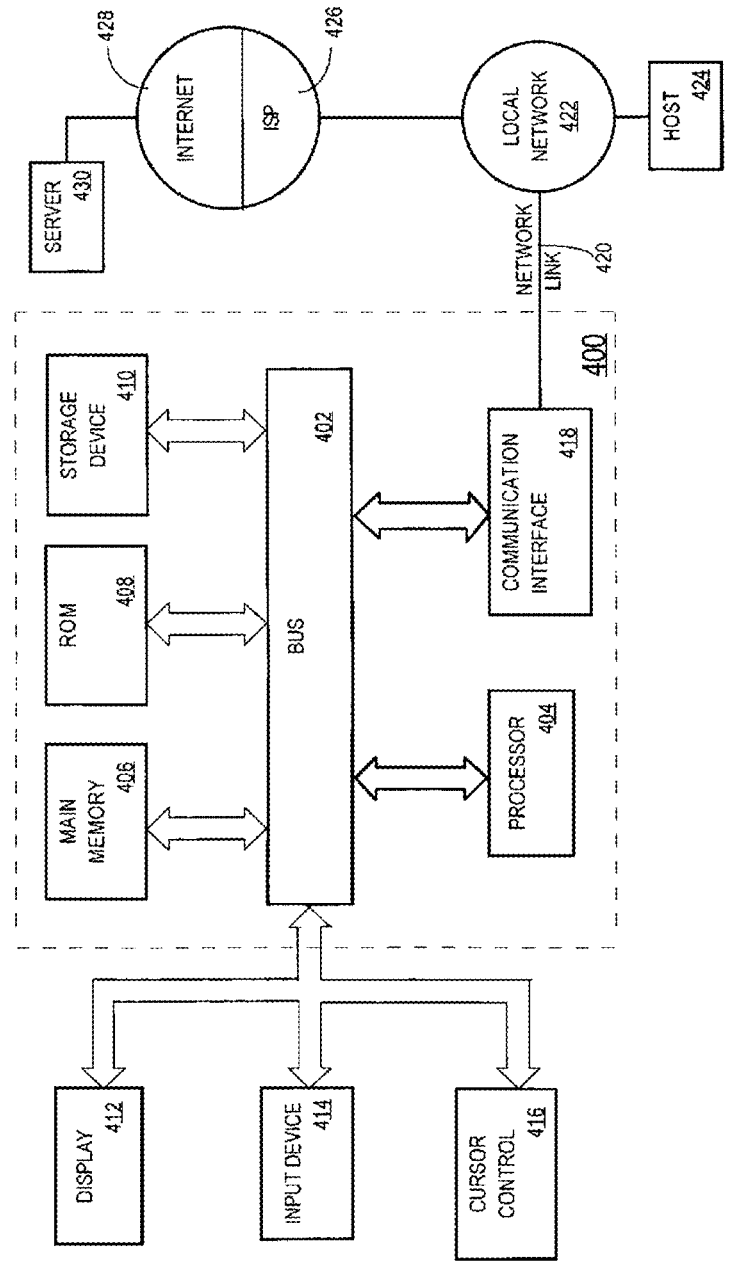
FIG. 9 shows a prior art computer system architecture.

FIG. 9 (see U.S. Pat. No. 7,702,660, expressly incorporated herein by reference), shows a block diagram that illustrates a computer system 400. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media. Non-volatile media includes, for example, semiconductor devices, optical or magnetic disks, such as storage device 410. Volatile media includes dynamic memory, such as main memory 406. All such media are tangible to enable the instructions carried by the media to be detected by a physical mechanism that reads the instructions into a machine. Common forms of machine-readable media include, for example, hard disk (or other magnetic medium), CD-ROM, DVD-ROM (or other optical or magnetoptical medium), semiconductor memory such as RAM, PROM, EPROM, FLASH-EPROM, any other memory chip or cartridge, a carrier wave as described hereinafter, or any other medium from which a computer can read. Various forms of machine-readable media may be involved in carrying one or more sequences of one or more instructions to processor 404 for execution.

For example, the instructions may initially be carried on a magnetic disk of a remote computer. The remote computer can load the instructions into its dynamic memory and send the instructions over the Internet through an automated computer communication network. An interface local to computer system 400, such as an Internet router, can receive the data and communicate using an Ethernet protocol (e.g., IEEE-802.X) to a compatible receiver, and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a local area network (LAN) card to provide a data communication connection to a compatible LAN. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including memory pages, memory sub-pages, and program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

CONCLUSION

Gang migration is presented with global deduplication (GMGD)—a solution to reduce the network load resulting from the simultaneous live migration of multiple VMs within a datacenter that has high-bandwidth low-delay interconnect. The present solution employs cluster-wide deduplication to identify, track, and avoid the retransmission of identical pages over core network links. Evaluations on a 30-node testbed show that GMGD reduces the amount of data transferred over the core links during migration by up to 65% and the total migration time by up to 42% compared to online compression.

In this description, several preferred embodiments were discussed. Persons skilled in the art will, undoubtedly, have other ideas as to how the systems and methods described herein may be used. It is understood that this broad invention is not limited to the embodiments discussed herein. Rather, the invention is limited only by the following claims. The various embodiments and sub-embodiments may be combined together in various consistent combinations sub-combinations and permutations, without departing from the spirit of this disclosure.

REFERENCES

See, each of which is expressly incorporated by reference in its entirety:

[1] A. Arcangeli, I. Eidus, and C. Wright. Increasing memory density by using ksm. In Proc. of Linux Symposium, July 2009.

[2] Network Performance Benchmark. www.netperf.org/netperf.

[3] E. Bugnion, S. Devine, and M. Rosenblum. Disco: Running commodity operating systems on scalable multiprocessors. In ACM Transactions on Computer Systems, October 1997.

[4] F. Chabaud and A. Joux. Differential collisions in sha-0. In Proc. of Annual International Cryptology Conference, August 1998.

[5] C. Clark, K. Fraser, S. Hand, J. G. Hansen, E. Jul, C. Limpach, I. Pratt, and A. Warfield. Live migration of virtual machines. In Proc. of Network System Design and Implementation, May 2005.

[6] Dbench. samba.org/ftp/tridge/dbench.

[7] U. Deshpande, U. Kulkarni, and K. Gopalan. Inter-rack live migration of multiple virtual machines. In Proc. of Virtualization Technologies in Distributed Computing, June 2012.

[8] U. Deshpande, X. Wang, and K. Gopalan. Live gang migration of virtual machines. In Proc. of High Performance Distributed Computing, June 2010.

[9] 10-Gigabit Ethernet. en.wikipedia.org/wiki/10_gigabit_ethernet.

[10] Gigabit Ethernet. en.wikipedia.org/wiki/gigabit_ethernet.

[11] D. Gupta, S. Lee, M. Vrable, S. Savage, A. C Snoeren, G. Varghese, G. M Voelker, and A. Vandat. Difference engine: Harnessing memory redundancy in virtual machines. In Proc. of Operating Systems Design and Implementation, December 2010.

[12] OpenSSL SHA1 hash. www.openssl.org/docs/crypto/sha.html.

[13] M. Hines, U. Deshpande, and K. Gopalan. Post-copy live migration of virtual machines. In SIGOPS Operating Systems Review, July 2009.

[14] W. Huang, Q. Gao, J. Liu, and D. K. Panda. High performance virtual machine migration with RDMA over modern interconnects. In Proc. of IEEE International Conference on Cluster Computing, September 2007.

[15] Infiniband. en.wikipedia.org/wiki/infiniband.

[16] H. Jin, L. Deng, S. Wu, X. Shi, and X. Pan. Live virtual machine migration with adaptive, memory compression. In Proc. of Cluster Computing and Workshops, August 2009.

[17] S. A. Kiswany, D. Subhraveti, P. Sarkar, and M. Ripeanu. Vmflock: Virtual machine co-migration for the cloud. In Proc. of High Performance Distributed Computing, June 2011.

[18] A. Kivity, Y. Kamay, D. Laor, U. Lublin, and A. Liguori. Kvm: The linux virtual machine monitor. In Proc. of Linux Symposium, June 2007.

[19] G. Milos, D. G. Murray, S. Hand, and M. A. Fetterman. Satori: Enlightened page sharing. In Proc. of USENIX Annual Technical Conference, June 2009.

[20] M. Nelson, B. H Lim, and G. Hutchins. Fast transparent migration for virtual machines. In Proc. of USENIX Annual Technical Conference, April 2005.

[21] A. Nocentino and P. M. Ruth. Toward dependency-aware live virtual machine migration. In Proc. of Virtualization Technologies in Distributed Computing, June 2009.

[22] Riteau, Pierre, Christine Morin, and Thierry Priol. "Shrinker: improving live migration of virtual clusters over WANs with distributed data deduplication and content-based addressing." *Euro-Par* 2011 *Parallel Processing*. Springer Berlin Heidelberg, 2011. 431-442.

[23] C. P. Sapuntzakis, R. Chandra, B. Pfaff, J. Chow, M. S Lam, and M. Rosenblum. Optimizing the migration of virtual computers. In Proc. of Operating Systems Design and Implementation, December 2002.

[24] Sysbench. sysbench.sourceforge.net/index.html.

[25] Rack Unit. en.wikipedia.org/wiki/rack_unit.

[26] C. A. Waldspurger. Memory resource management in VMware ESX server. In Proc. of Operating Systems Design and Implementation, December 2002.

[27] J. Wang, K. L Wright, and K. Gopalan. XenLoop: a transparent high performance inter-vm network loopback. In Proc. of High performance distributed computing, June 2008.

[28] T. Wood, K. K Ramakrishnan, P. Shenoy, and J. Van Der Merwe. Cloudnet: dynamic pooling of cloud resources by live wan migration of virtual machines. In Proc. of Virtual Execution Environments, March 2011.

[29] T. Wood, G. Tarasuk-Levin, P. Shenoy, P. Desnoyers, E. Cecchet, and M. D. Corner. Memory buddies: exploiting page sharing for smart colocation in virtualized data centers. In Proc. of Virtual Execution Environments, March 2009.

[30] L. Xia and P. A. Dinda. A case for tracking and exploiting inter-node and intra-node memory content sharing in virtualized large-scale parallel systems. In Proc. of Virtualization Technologies in Distributed Computing, June 2012.

[31] X. Zhang, Z. Huo, J. Ma, and D. Meng. Exploiting data deduplication to accelerate live virtual machine migration. In Proc. of IEEE International Conference on Cluster Computing, September 2010.

[32] Deshpande, Umesh, Xiaoshuang Wang, and Kartik Gopalan. "Live gang migration of virtual machines." *Proceedings of the 20th international symposium on High performance distributed computing*. ACM, 2011.

[33] Riteau, Pierre, Chritine Morin, and Thierry Priol. "Shrinker: efficient live migration of virtual clusters over wide area networks." *Concurrency and Computation: Practice and Experience* 25.4 (2013): 541-555.

[34] Kapil, Divya, Emmanuel S. Pilli, and Ramesh C. Joshi. "Live virtual machine migration techniques: Survey and research challenges." *Advance Computing Conference (IACC)*, 2013 IEEE 3rd International. IEEE, 2013.

[35] Veni, T., Saira Bhanu, and S. Mary. "Dynamic Energy Management In Cloud Data Centers: A Survey." *International Journal on Cloud Computing: Services & Architecture* 3.4 (2013).

[36] HU, Liang, et al. "A Fast Convergent Live Migration of Virtual Machine." (2012).

[37] Zhao, Jia, et al. "A Fast Live Migration Algorithm of Virtual Machine with CPU Scheduling."

[38] Veni, T., and S. Mary Saira Bhanu. "A Survey On Dynamic Energy Management At Virtualization Level In Cloud Data Centers." *Computer Science* (2013).

[39] Hu, Liang, et al. "A Survey on Data Migration Management in Cloud Environment." *Journal of Digital Information Management* 10.5 (2012).

[40] Gustafsson, Erik. "Optimizing Total Migration Time in Virtual Machine Live Migration." (2013).

[41] Hou, Kai-Yuan, et al. "Tradeoffs in compressing virtual machine checkpoints." *Proceedings of the 7th international workshop on Virtualization technologies in distributed computing*. ACM, 2013.

[42] Snir, Marc. "CCGrid 2013."

[43] Cui, Lei, et al. "VMScatter: migrate virtual machines to many hosts." *Proceedings of the 9th ACM SIGPLAN/SIGOPS international conference on Virtual execution environments*. ACM, 2013.

[44] Xia, Lei, and Peter A. Dinda. "A case for tracking and exploiting inter-node and intra-node memory content sharing in virtualized large-scale parallel systems." *Proceedings of the 6th international workshop on Virtualization Technologies in Distributed Computing Date*. ACM, 2012.

[45] Lagar-Cavilla, H. Andres, et al. "Transparent Automatic Migration of Interactive Resource-Intensive Applications." *School of Computer Science, Carnegie Mellon University*. 2007.

[46] Jo, Changyeon, et al. "Efficient live migration of virtual machines using shared storage." *Proceedings of the 9th ACM SIGPLAN/SIGOPS international conference on Virtual execution environments*. ACM, 2013.

[47] Jo, Changyeon, and Bernhard Egger. "Optimizing Live Migration for Virtual Desktop Clouds." 2013

[48] Kang, Tae Seung, et al. "Reducing the Migration Times of Multiple VMs on WANs Using a Feedback Controller." *Parallel and Distributed Processing Symposium Workshops & PhD Forum (IPDPSW)*, 2013 IEEE 27th International. IEEE, 2013.

[49] Ghorbani, Soudeh, et al. "Transparent, Live Migration of a Software-Defined Network." Technical report, CS UIUC, 2013.

[50] Svärd, Petter, et al. *Hecatonchire: Enabling Multi-Host Virtual Machines by Resource Aggregation and Pooling*. Technical report, 2014. Tech Report UMINF 14.11. Submitted, 2014.

[51] Xu, Fei, et al. "Managing Performance Overhead of Virtual Machines in Cloud Computing: A Survey, State of the Art, and Future Directions." *Proceedings of the IEEE* 102.1 (2014): 11-31.

[52] Jamkhedkar, Pramod, et al. "A Framework for Realizing Security on Demand in Cloud Computing." 2013.

[53] Liu, Haikun, and Bingsheng He. "VMbuddies: Coordinating Live Migration of Multi-Tier Applications in Cloud Environments." 1-1. IEEE Trans on Parallel and Distributed Systems, (Volume: PP, Issue: 99) Page 1. (2014).

[54] Bazarbayev, Sobir, et al. "Content-Based Scheduling of Virtual Machines (VMs) in the Cloud." *Distributed Computing Systems (ICDCS)*, 2013 IEEE 33rd International Conference on. IEEE, 2013.

[55] Xia, Lei, Kyle Hale, and Peter Dinda. "ConCORD: Easily Exploiting Memory Content Redundancy Through the Content-aware Service Command." 2013

[56] Perez-Botero, Diego. "Pwnetizer: Improving Availability in Cloud Computing through Fast Cloning and I/O Randomization." (2013).

[57] Bazarbayev, Sobir. "Content-aware resource scheduling for commercial and personal clouds." (2013).

[58] J. G. Hansen and E. Jul. Self-migration of operating systems. In In Proc. of the 11th ACM SIGOPS, 2004.

[59] John Levon. OProfile: System-wide profiler for Linux systems, oprofile.sourceforge.net/about/.

[60] Mark Lewandowski, Mark Stanovich, Ted Baker, Kartik Gopalan, and Andy Wang. Modeling device driver effects in real-time schedulability analysis: Study of a network driver. In Proc. of the IEEE Real-Time and Embedded Technology and Applications Symposium (RTAS), Bellevue, Wash., April 2007.

[61] Chang Li, Gang Peng, Kartik Gopalan, and Tzi-cker Chiueh. Performance guarantee for cluster-based internet services. In Proc. of Intl. Conference on Distributed Computing Systems (ICDCS 2003), Providence, R.I., May 2003.

[62] Zhao Lin, Kartik Gopalan, and Ping Yang. Virtual append-only storage for secure logging in virtual machines. In Proceedings of 2nd ICPP International Workshop on Security in Cloud Computing, pages 245-250, 2010.

[63] Michael Litzkow, Miron Livny, and Matthew Mutka. Condor—a hunter of idle workstations. In Proc. of International Conference of Distributed Computing Systems, June 1988.

[64] Yu David Liu and Kartik Gopalan. Interaction-based programming towards translucent clouds. In Proc. of ACM Workshop on Analysis and Programming Languages for Web Applications and Cloud Applications, 2010.

[65] Steven Loscalzo, Kevin Acunto, Robert Wright, and Lei Yu. Progressive mining of transition dynamics for autonomous control. In Proceedings of the IEEE International Conference on Data Mining, 2012.

[66] Steven Loscalzo, Robert Wright, Kevin Acunto, and Lei Yu. Sample aware embedded feature selection for reinforcement learning. In Proceedings of the ACM SIGEVO 14th Annual Genetic and Evolutionary Computation Conference, pages 887-894, 2012.

[67] Ruiqi Luo, Ping Yang, Shiyong Lu, and Mikhail I. Gofman. Analysis of scientific workflow provenance access control policies. In The 9th IEEE International Conference on Services Computing (SCC), 2012.

[68] Marvin McNett, Diwaker Gupta, Amin Vandat, and Geoffrey M. Voelker. Usher: An extensible framework for managing clusters of virtual machines. In Proc. of Large Installation System Administration Conference (LISA'07), 2007.

[69] D. Milojicic, F. Douglis, Y. Paindaveine, R. Wheeler, and S. Zhou. Process migration survey. ACM Computing Surveys, 32(3):241-299, September 2000.

[70] Christopher Mitchell, Vikram Munishwar, Shailendra Singh, Xiaoshuang Wang, Kartik Gopalan, and Nael Abu-Ghazaleh. Testbed design and localization in mint-2: A minia-turized robotic platform for wireless protocol development and emulation. In International Conference on Communication Systems and Networks (COMSNETS), 2009.

[71] Vikram Munishwar, Shailendra Singh, Xiaoshuang Wang, Christopher Mitchell, Kartik Gopalan, and Nael Abu-Ghazaleh. On the accuracy of RFID-based localization in a mobile wireless network testbed. In IEEE PerCom Workshop on Pervasive Wireless Networking (PWN), 2009.

[72] NAS Parallel Benchmarks. www.nas.nasa.gov/Resources/Software/npb.html.

[73] M. Nelson, B. Lim, and G. Hutchins. Fast transparent migration for virtual machines. In Proceedings of the annual conference on USENIX Annual Technical Conference, pages 25-25, 2005.

[74] Michael Nelson, Beng-Hong Lim, and Greg Hutchins. Fast transparent migration for virtual machines. In Usenix 2005, Anaheim, Calif., pages 25-25.

[75] Suzaki, Kuniyasu, et al. "Moving from logical sharing of guest OS to physical sharing of deduplication on virtual machine." Proc. 5th USENIX Workshop on Hot Topics in Security (HotSec 2010), USENIX, Washington D.C., USA. 2010.

[76] Sun Developer Network. Java PetStore, java.sun.com/developer/releases/petstore/.

[77] V. Nipunage, M. Gofman, K. Gopalan, and P. Yang. KVMLoop: A transparent inter-vm network loopback for KVM, Masters Thesis, Computer Science, Binghamton University. Technical report, 2011.

[78] J. Oberheide, E. Cooke, and F. Jahanian. Exploiting live virtual machine migration. In Black Hat, 2008.

[79] OpenVZ. Container-based Virtualization for Linux, www.openvz.com/.

[80] Oracle. Oracle vm. www.oracle.com/us/026951.pdf?ssSourceSiteId=.

[81] S. Osman, D. Subhraveti, G. Su, and J. Nieh. The design and implementation of zap: A system for migrating computing environments. In Proc. of OSDI, pages 361-376, 2002.

[82] POV-Ray. The Persistence of Vision Raytracer, pov-ray.org/.

[83] Prashant Pradhan, Kartik Gopalan, and Tzi-cker Chiueh. Design issues in system support for programmable routers. In Proc. of 8th Workshop on Hot Topics in Operating Systems (HotOS-VIII), Schloss Elmau, Germany, pages 3-14, May 2001.

[84] Proxmox. Proxmox VE. pve.proxmox.com/.

[85] Vijay Shankar Rajanna, Anand Jahagirdar, Smit Shah, and Kartik Gopalan. Explicit coordination to prevent congestion in data center networks. Journal of Cluster Computing, pages 183-200, 2012.

[86] Vijay Shankar Rajanna, Smit Shah, Anand Jahagirdar, and Kartik Gopalan. Xco: Explicit coordination for preventing congestion in data center ethernet. In Proc. of 6th IEEE Inter-national Workshop on Storage Network Architecture and Parallel I/Os, pages 81-89, 2010.

[87] Vijay Shankar Rajanna, Smit Shah, Anand Jahagirdar, Christopher Lemoine, and Kartik Gopalan. Xco: Explicit coordination to prevent network fabric congestion in cloud computing cluster platforms. In Proc. of 19th ACM International Symposium on High Performance Distributed Computing (HPDC), 2010.

[88] Ashish Raniwala, Kartik Gopalan, and Tzi-cker Chiueh. Centralized algorithms for multi-channel wireless mesh networks. ACM SIGMOBILE Mobile Computing and Communications Review, 8(2):50-65, April 2004.

[89] Rether Networks Inc. Internet Service Management Device, www.rether.com/ISMD.htm.

[90] Rether Networks Inc. Real-time Ethernet Protocol, www.rether.com/RETHER.htm.

[91] P. Riteau, C. Morin, and T. Priol. Shrinker: Improving live migration of virtual clusters over wans with distributed data deduplication and content-based addressing. In Proc. Of EUROPAR, September 2011.

[92] C. Sapuntzakis, R. Chandra, B. Pfaff, J. Chow, M. S. Lam, and M. Rosenblum. Optimizing the migration of virtual computers. In Proc. of OSDI, December 2002.

[93] Amit Sasturkar, Ping Yang, Scott D. Stoller, and C R Ramakrishnan. Policy analysis for administrative role based access control. Theoretical Computer Science, 412 (44):6208-6234, 2011.

[94] M. Satyanarayanan and B. Gilbert et al. Pervasive personal computing in an internet suspend/resume system. IEEE Internet Computing, 11(2):16-25, 2007.

[95] B. K. Schmidt. Supporting Ubiquitous Computing with Stateless Consoles and Computation Caches. PhD thesis, Computer Science Dept., Stanford University, 2000.

[96] Srikant Sharma, Jiawu Chen, Wei Li, Kartik Gopalan, and Tzi-cker Chiueh. Duplex: A reusable fault-tolerance extension for network access devices. In Proc. of Intl. Conference on Dependable Systems and Networks (DSN) 2003, San Francisco, Calif., June 2003.

[97] Srikant Sharma, Kartik Gopalan, Susanta Nanda, and Tzi-cker Chiueh. Viking: A multi-spanning-tree ethernet architecture for metropolitan area and cluster networks. In Proc. of IEEE Infocom, Hong Kong, China, March 2004.

[98] Srikant Sharma, Kartik Gopalan, Ninging Zhu, Gang Peng, Pradipta De, and Tzi-cker Chiueh. Implementation Experiences of Bandwidth Guarantee on a Wireless LAN. In Proceedings of ACM/SPIE Multimedia Computing and Networking (MMCN 2002), January 2002.

[99] Marcio A. Silva, Michael R. Hines, Diego Gallo, Qi Liu, Kyung Dong Ryu, and Dilma Da Silva. Cloudbench: Experiment automation for cloud environments. In To appear in Proc. of IEEE International Conference on Cloud Engineering (IC2E), 2013.

[100] J. E. Smith and R. Nair. Virtual Machine: Versatile Platforms for Systems and Processes. Morgan Kaufmann, 2005.

[101] Q. O. Snell, A. R. Mikler, and J. L. Gustafson. NetPIPE: A network protocol independent performance evaluator. In Proc. of IASTED International Conference on Intelligent Information Management and Systems, 1996.

[102] [102] Standard Performance Evaluation Corporation. Specvirt sc2010 Benchmark, www.spec.org/virt sc2010.

[103] [103] Standard Performance Evaluation Corporation. SPECweb99 Benchmark, www.spec.org/osg/web99.

[104] E. Stark. SAMSON: A Scalable Active Memory Server on a Network, bsd7.starkhome.cs.sunysb.edu/~samson. August 2003.

[105] S. D. Stoller, P. Yang, C. R. Ramakrishnan, and M. I. Gofman. Efficient policy analysis for administrative role based access control. In 14th ACM Conference on Computer and Communications Security (CCS), pages 445-455, 2007.

[106] Scott D. Stoller, Ping Yang, Mikhail I. Gofman, and C. R. Ramakrishnan. Symbolic reachability analysis for parameterized administrative role-based access control. Journal of Computers & Security, pages 148-164, 2011.

[107] Sun Microsystems. The GridEngine Project, gridengine.sunsource.net/.

[108] Yoshi Tamura. Kemari. wiki.qemu.org/features/fault-tolerance.

[108] Yoshi Tamura. Kemari. wiki.qemu.org/features/fault-tolerance.

[109] Douglas Thain, Todd Tannenbaum, and Miron Livny. Distributed computing in practice: the condor experience. Concurrency—Practice and Experience, 17(2-4):323-356, 2005.

[110] The Apache Software Foundation. HTTP Server Project httpd.apache.org/.

[111] The NSF Grid Project. www.nsfgrid.marist.edu/.

[112] The Open Science Grid. www.opensciencegrid.org/.

[113] Transaction Processing Performance Council. TPC-C V5, www.tpc.org/tpcc.

[114] D. Turner, A. Oline, X. Chen, and T. Benjegerdes. Integrating new capabilities into NetPIPE. In Proc. of 10th European PVM/MPI conference, Venice, Italy, 2003.

[115] Ohio State University. OSU MPI Benchmark, mvapich.cse.ohio-state.edu/benchmarks/.

[116] VMWare. VMware vSphere 5.1 vMotion Architecture, Performance and Best Practices, www.vmware.com/files/pdf/techpaper/VMware-vSphere51-vMotion-Perf.pdf.

[117] VMWare Corporation. VMWare Distributed Resource Scheduler www.vmware.com/products/vi/vc/drs.html.

[118] VMWare Corporation. VMWare ESX Server, www.vmware.com/products/vi/esx/.

[119] C. A. Waldspurger. Memory resource management in VMware ESX server. In Operating Systems Design and Implementation, December 2002.

[120] Jian Wang, Kwame-Lante Wright, and Kartik Gopalan. Xenloop: a transparent high performance inter-VM network loopback. In Proceedings of the 17th international symposium on High performance distributed computing, pages 109-118, 2008.

[121] Sharma, Prateek, and Purushottam Kulkarni. "Singleton: system-wide page deduplication in virtual environments." Proceedings of the 21st international symposium on High-Performance Parallel and Distributed Computing. ACM, 2012.

Dow, Eli M., et al. "Symmetric live migration of virtual machines." U.S. Pat. No. 8,370,560. 5 Feb. 2013.

[122] A. Whitaker, R. S. Cox, M. Shaw, and S. D. Grible. Constructing services with interposable virtual hardware. In Proc. of NSDI 2004, pages 13-13, 2004.

[123] A. Whitaker, M. Shaw, and S. D. Gribble. Scale and performance in the denali isolation kernel. In Proc. of OSDI 2002, pages 195-209, New York, N.Y., USA, 2002.

[124] P. Yang, S. Basu, and C. R. Ramakrishnan. Parameterized verification of pi-calculus systems. In 12th. International Conference on Tools and Algorithms for the Construction and Analysis of Systems, Lecture Notes in Computer Science, pages 42-57. Springer-Verlag, 2006.

[125] P. Yang, Y. Dong, C. R. Ramakrishnan, and Scott A. Smolka. A provably correct compiler for efficient model checking of mobile processes. In 7th International Symposium on Practical Aspects of Declarative Languages, volume 3350 of Lecture Notes in Computer Science, pages 113-227. Springer-Verlag, 2005.

[126] P. Yang, C R Ramakrishnan, and S. A. Smolka. A logical encoding of the pi-calculus: model checking mobile processes using tabled resolution. International Journal on Software Tools for Technology Transfer, 6(1): 38-66, 2004.

[127] Ping Yang, Shiyong Lu, Mikhail Gofman, and Zijiang Yang. Information flow analysis of scientific workflows. to appear, Special issue on scientific workflows, Journal of Computer and System Sciences (JCSS), pages 390-402, 2009.

[128] Lei Yu, Yue Han, and Michael E Berens. Stable gene selection from microarray data via sample weighting. IEEE/ACM Transactions on Computational Biology and Bioinformatics, 2011.

[129] J. Hansen and A. Henriksen. Nomadic operating systems. In Master's thesis, Dept. of Computer Science, University of Copenhagen, Denmark, 2002.

[130] B. Cully, G. Lefebvre, and D. Meyer. Remus: High availability via asynchronous virtual machine replication. In Networked Systems Design and Implementation, 2008.

[131] HP VM. h18000.www1.hp.com/products/quickspecs/13375\_div/13375\_div.PDF.

[132] Boris Danev, Ramya Jayaram Masti, Ghassan O. Karame, and Srdjan Capkun. Enabling secure vm-vtpm migration in private clouds. In Proceedings of the 27th Annual Computer Security Applications Conference, pages 187-196, 2011.

[133] Robert Bradford, Evangelos Kotsovinos, Anja Feldmann, and Harald Schi oberg. Live wide-area migration of virtual machines including local persistent state. In Proc. of the VEE, pages 169-179, 2007.

[134] H. Jin, L. Deng, S. Wu, X. Shi, and X. Pan. Live virtual machine migration with adaptive, memory compression. In Proc. of Cluster Computing and Workshops, August 2009.

[135] Tal Garfinkel and Mendel Rosenblum. When virtual is harder than real: security challenges in virtual machine based computing environments. In HOTOS 2005, pages 20-20, Berkeley, Calif., USA.

[136] Cluster Resources. MAUI Cluster Scheduler, www-.clusterresources.com/pages/products/maui-cluster-scheduler.php/.
[137] PBS Gridworks. Portable Batch Systems, www.pbsgridworks.com/.
[138] Platform Inc. Platform Load Sharing Facility (LSF), www.platform.com/Products/platform-lsf.
[139] IBM Corporation. Tivoli Workload Scheduler Load-Leveler, www-03.ibm.comlsystems/clusters/software/loadleveler/index.html.
[48] MySQL Inc. MySQL, www.mysql.com.
[140] XenSource Inc. XenEnterprise, www.xensource.com/products/xen enterprise/.
[141] Hewlett Packard Corporation. HP Virtual Machine Management Pack, h18004.www1.hp.com/products/servers/proliantessentials/valuepack/vms/.
[142] Laura Grit, David Irwin, Aydan Yumerefendi, and Jeff Chase. Virtual machine hosting for networked clusters: Building the foundations for "autonomic" orchestration. In Proc. of Workshop on Virtualization Technology in Distributed Computing (VTDC), November 2006.
[143] Juniper Networks Inc. Alternatives for securing virtual networks: A different network requires a different approach: Extending security to the virtual world, white paper 1000220-012-en, 2011.
[144] VMWare Corporation. VMark Virtualization Benchmark, www.vmware.com/products/vmmark/.
[145] Umesh Deshpande, Beilan Wang, Shafee haque, Michael Hines, and Kartik Gopalan. Memx: Virtualization of cluster-wide memory. In Proc. of 39th International Conference on Parallel Processing (ICPP), pages 663-672, 2010.
[146] 10-Gigabit Ethernet. en.wikipedia.org/wiki/10 gigabit ethernet.
[147] Gigabit Ethernet. en.wikipedia.org/wiki/gigabit ethernet.
[148] Navodaya Garepalli, Kartik Gopalan, and Ping Yang. Control message reduction techniques in backward learning ad hoc routing protocols. In Proc. of International Conference on Computer Communication Networks (ICCCN), U.S. Virgin Islands, August 2008.
[149] M. Gofman, R. Luo, J. He, Y. Zhang, and P. Yang. Incremental information flow analysis of role based access control. In International Conference on Security and Management, pages 397-403, 2009.
[150] M. Gofman, R. Luo, A. Solomon, Y. Zhang, P. Yang, and S. Stoller. Rbac-pat: A policy analysis tool for role based access control. In 15th International Conference on Tools and Algorithms for the Construction and Analysis of Systems (TACAS), pages 46-49, 2009.
[151] Mikhail Gofman, Ruiqi Luo, and Ping Yang. User-role reachability analysis of evolving ad-ministrative role based access control. In 15th European Symposium on Research in Computer Security (ESORICS), pages 455-471, 2010.
[152] Mikhail I. Gofman, Ruiqi Luo, Ping Yang, and Kartik Gopalan. SPARC: A security and privacy aware virtual machine checkpointing mechanism. In Proceedings of the 10th annual ACM Workshop on Privacy in the Electronic Society (WPES), in conjunction with the ACM Conference on Computer and Communications Security (CCS), pages 115-124, 2011.
[153] Kartik Gopalan and Tzi-cker Chiueh. Multi-resource allocation and scheduling for periodic soft real-time applications. In Proc. of ACM/SPIE Multimedia Computing and Networking (MMCN2002), San Jose, Calif., January 2002.
[154] Kartik Gopalan, Tzi-cker Chiueh, and Yow-Jian Lin. Slack allocation techniques for intra-path load balancing. Journal of High Speed Networks, 16(3):211-237, 2007.
[155] Kartik Gopalan, Tzi-cker Chiueh, and Yow-Jian Lin. Load balancing routing with bandwidth-delay guarantees. IEEE Communications Magazine, 42(6):108-113, June 2004.
[156] Kartik Gopalan, Tzi-cker Chiueh, and Yow-Jian Lin. Network-wide load balancing routing with performance guarantees. In Proc. of ICC 2006, Istanbul, Turkey, June 2006.
[157] Kartik Gopalan, Tzi-cker Chiueh, and Yow-Jian Lin. Load balancing routing of fault tolerant qos-guaranteed vpns. In Proc. of International Workshop on Quality of Service (IWQoS), June 2007.
[158] Kartik Gopalan, Tzi-cker Chiueh, and Yow-Jian Lin. Delay budget partitioning to maximize network resource usage efficiency. In Proc. IEEE INFOCOM'04, Hong Kong, China, March 2004.
[159] Kartik Gopalan, Tzi-cker Chiueh, and Yow-Jian Lin. Probabilistic delay guarantees using delay distribution measurements. In Proc. of ACM Multimedia 2004, New York, N.Y., October 2004.
[160] Kartik Gopalan, Lan Huang, Gang Peng, Tzi-cker Chiueh, and Yow-Jian Lin. Statistical admission control using delay distribution measurements. ACM Transactions on Multimedia Computing, Communications and Applications, 2(4), November 2006.
[161] Kartik Gopalan and Kyoung-Don Kang. Coordinated allocation and scheduling of multiple resources in real-time operating systems. In Proc. of Workshop on Operating Systems Platforms for Embedded Real-Time Applications (OSPERT), Pisa, Italy, June 2007.
[162] Kartik Gopalan, Ping Yang, Lijun Yin, and Lei Yu. Virtualized cluster testbed to support research in large memory and data intensive applications, NSF CRI grant, 2009-2012.
[163] D. Gupta, R. Gardner, and L. Cherkasova. Xenmon: Qos monitoring and performance profiling tool. Technical Report HPL-2005-187, HP Labs, October 2005.
[164] Hewlett Packard Corporation. Xenoprof—System-wide profiler for Xen V M, xenoprof.sourceforge.net/.
[165] Michael Hines and Kartik Gopalan. MemX: Supporting large memory workloads in xen virtual machines. In International Workshop on Virtualization Technology in Distributed Computing (VTDC), November 2007.
[166] Michael Hines, Mark Lewandowski, Jian Wang, and Kartik Gopalan. Implementation experiences in transparently harnessing cluster-wide memory. In Proc. of the International Symposium on Performance Evaluation of Computer and Telecommunication Systems (SPECTS), July 2006.
[167] Michael Hines, Jian Wang, and Kartik Gopalan. Distributed Anemone: Transparent Low-Latency Access to Remote Memory in Commodity Clusters. In Proc. of the International Conference on High Performance Computing (HiPC), December 2006.
[168] IBM Corporation. IBM Blue Cloud, www-03.ibm.com/press/us/en/pressrelease/22613.wss.
[169] Infiniband. en.wikipedia.org/wiki/infiniband.
[150] Information Sciences Institute. The Network Simulator-ns-2. In www.isi.edu/nsnam/ns/.
[171] Institute for Information Infrastructure Protection (I3P). www.thei3p.org/.
[172] Kernel Samepage Merging. en.wikipedia.org/wiki/kernel samepage merging ksm.

[173] Samer Al Kiswany, Dinesh Subhraveti, Prasenjit Sarkar, and Matei Ripeanu. Vmflock: Virtual machine co-migration for the cloud. In Proc. of High Performance Distributed Computing, June 2011.
[174] Lim, Kevin, et al. "Disaggregated Memory Benefits for Server Consolidation." (2011).
[175] Lim, Kevin, et al. "System-level implications of disaggregated memory." *High Performance Computer Architecture (HPCA)*, 2012 *IEEE* 18*th International Symposium on*. IEEE, 2012.
[176] Samih, Ahmad, et al. "A collaborative memory system for high-performance and cost-effective clustered architectures." *Proceedings of the* 1*st Workshop on Architectures and Systems for Big Data*. ACM, 2011.
[177] Liang, S., R. Noronha, and D. K. Panda. "Swapping to remote memory over infiniband." *Cluster Computing* (2005).
[178] Al-Kiswany, Samer, et al. "VMFlock: virtual machine co-migration for the cloud." *Proceedings of the* 20*th international symposium on High performance distributed computing*. ACM, 2011.
[179] Lawton, Kevin P., and Stevan Vlaovic. "Using memory equivalency across compute clouds for accelerated virtual memory migration and memory de-duplication." U.S. patent application Ser. No. 12/368,247.
[180] Takahashi, Kazushi, Koichi Sasada, and Takahiro Hirofuchi. "A fast virtual machine storage migration technique using data deduplication." *CLOUD COMPUTING* 2012, *The Third International Conference on Cloud Computing, GRIDs, and Virtualization*. 2012.
[181] Bose, Sumit Kumar, et al. "CloudSpider: Combining replication with scheduling for optimizing live migration of virtual machines across wide area networks." *Cluster, Cloud and Grid Computing (CCGrid)*, 2011 11*th IEEE/ACM International Symposium on*. IEEE, 2011.
[182] Chiang, Jui-Hao, Han-Lin Li, and Tzi-cker Chiueh. "Introspection-based memory de-duplication and migration." *Proceedings of the* 9*th ACM SIGPLAN/SIGOPS international conference on Virtual execution environments*. ACM, 2013.
[183] Devine, Wesley M., Sivaram Gottimukkala, Lap T. Huynh, Dinakaran Joseph, Michael S. Law, and Linwood H. Overby Jr. "Securing live migration of a virtual machine within a service landscape." U.S. patent application Ser. No. 12/210,249, filed Sep. 15, 2008.
[184] Ma, Yanqing, et al. "Me2: Efficient live migration of virtual machine with memory exploration and encoding." *Cluster Computing (CLUSTER)*, 2012 *IEEE International Conference on*. IEEE, 2012.
[185] Akiyama, Soramichi, et al. "Miyakodori: A memory reusing mechanism for dynamic vm consolidation." *Cloud Computing (CLOUD)*, 2012 *IEEE* 5*th International Conference on*. IEEE, 2012.
[186] Hu, Wenjin, et al. "A quantitative study of virtual machine live migration." *Proceedings of the* 2013 *ACM Cloud and Autonomic Computing Conference*. ACM, 2013.
[187] Suzaki, Kuniyasu, et al. "Memory deduplication as a threat to the guest OS." Proceedings of the Fourth European Workshop on System Security. ACM, 2011.

What is claimed is:

1. A method of tracking duplication of memory content, comprising:
computing in each of a plurality of servers, a respective a hash value for each of a plurality of respective memory pages used by the plurality of servers;
communicating the hash value for each of the plurality of respective memory pages for the plurality of servers to a memory control server for the plurality of servers, to form a hash table;
transmitting the hash table of the memory control server for the plurality of servers through a communication network to a corresponding memory control server for a different plurality of servers;
receiving, from the corresponding memory control server, a corresponding hash table comprising a plurality of corresponding hash values for memory pages used by the different plurality of servers;
comparing, by the memory control server, the respective hash values in the hash table with the corresponding hash values in the corresponding hash table; and
determining memory duplication between the plurality of server and the plurality of different servers, based on said comparing.

2. The method according to claim 1, further comprising:
determining, by the memory control server, uniqueness of each memory page within the hash table; and
sending a single copy of unique memory page content to the corresponding memory control server.

3. The method according to claim 1, further comprising:
sending a copy of unique memory page content from the memory control server to the corresponding memory control server if the unique memory page content is not present at any of the different plurality of servers.

4. The method according to claim 1, further comprising:
receiving, by the memory control server, a memory page having unique memory page content not present in the plurality of respective memory pages used by the plurality of servers; and
duplicating, under control of the memory control server, the unique memory page content within the plurality of servers.

5. The method according to claim 4, wherein the plurality of servers are involved in a gang migration of a plurality of live servers comprising the plurality of servers to the plurality of different servers, further comprising communicating a central processing unit state for a respective live server from the memory control server to the corresponding memory control server.

6. The method according to claim 1, wherein the plurality of servers are organized in a cluster, running a plurality of virtual machines, which communicate with each other and the memory control server using a communication medium selected from the group consisting of Gigabit Ethernet, 10GigE, and Infiniband.

7. The method according to claim 1, wherein the plurality of servers implement a plurality of virtual machines, wherein the hash table of the memory control server is organized according to memory page association with a respective virtual machine.

8. The method according to claim 1, further comprising communicating, by the memory control server to the corresponding memory control server, a plurality of memory pages, each having unique memory page content, prioritized with respect to at least one of a memory page dirtying rate and a delta difference for dirtied memory pages.

9. The method according to claim 1, wherein said memory control server has a distributed architecture, and said determining memory duplication comprises implementing a distributed indexing mechanism which computes content hashes on a plurality of servers.

10. The method according to claim 9, wherein the distributed indexing mechanism comprises a distributed hash table.

11. The method according to claim 1, wherein each memory page has a unique identifier comprising a respective identification of an associated virtual machine.

12. The method according to claim 1, wherein the hash table further comprises a memory page status for each respective memory page.

13. The method according to claim 12, further comprising:
sending a respective memory page from the memory control server to the corresponding memory control server; and
updating the memory page status in the hash table with an indication that the respective memory page has been sent.

14. The method according to claim 1, further comprising:
maintaining, by the memory control server, a list of servers of the plurality of servers that require a copy of a respective memory page by the memory control server;
retrieving a copy of a respective memory page by the memory control server from the corresponding memory control server;
sending the retrieved copy of the respective memory page to each server of the plurality of servers that requires a copy of the respective memory page based on the list of servers; and
marking the memory page as having been sent in the hash table.

15. The method according to claim 14,
wherein the list of servers is sorted in order of most recently changed memory page;
said retrieving is performed according to the sorted order; and
after a respective memory page is marked as having been sent, the memory control server removes references to earlier versions of that respective memory page from the list of servers without overwriting any more recent copy of the respective memory page.

16. The method according to claim 1, further comprising performing a live gang migration of a plurality of virtual machines executing on the plurality of servers to the corresponding plurality of servers, wherein:
a respective virtual machine executing on the plurality of servers remains operational until at least one version of each memory page of the respective virtual machine is transferred to the corresponding plurality of servers;
the respective virtual machine is inactivated after at least one version of each memory page of the respective virtual machine is transferred to the corresponding plurality of servers; and
a replica of the respective virtual machine is activated to execute on the corresponding plurality of servers using the transferred at least one version of each memory page of the respective virtual machine.

17. A method for transfer of information to a plurality of servers in a server rack under control of a memory server, from a corresponding memory server, comprising:
determining the content redundancy in memory pages or sub-pages across the plurality of servers in the server rack at a respective time for each respective memory page or sub-page;
transferring, from the corresponding memory server to the memory server, a copy of each unique memory page or sub-page through a communication interface of the server rack;
determining, by the memory server, which of the plurality of servers in the server rack require the unique memory page or sub-page; and
duplicating, under control of the memory server, the unique memory page or sub-page within the server rack for each server that requires but did not receive the copy of the unique memory page or sub-page.

18. The method according to claim 17, wherein the plurality of servers are involved in a gang migration of a plurality of live servers, further comprising receiving by the memory server, a central processing unit state for a respective live server from the corresponding memory server.

19. A method for gang migration, comprising:
determining, by a memory server associated with the plurality of servers, a content redundancy in memory pages for use by a plurality of virtual machines to be gang migrated to the plurality of servers;
initiating a gang migration under control of the memory server, wherein only a single copy of each unique memory page according to the determined content redundancy is transferred during the gang migration to the plurality of servers, with a reference to each respective unique memory page for virtual machines that require but do not receive a copy of the unique memory page; and
after receipt of a unique memory page by the plurality of servers, communicating the unique memory page under control of the memory server to each virtual machine that requires but did not receive the copy of the unique memory page.

20. The method according to claim 19, wherein the plurality of servers are involved in a gang migration of a plurality of live virtual machines, further comprising receiving, by the memory server, a central processing unit state for each respective live virtual machine and activating each respective live virtual machine after receipt of its respective central processing unit state and communication of each unique memory page required by the respective live virtual machine.

* * * * *